(12) United States Patent
Hirano et al.

(10) Patent No.: US 11,005,645 B2
(45) Date of Patent: May 11, 2021

(54) ENCRYPTION DEVICE, ENCRYPTION METHOD, COMPUTER READABLE MEDIUM, AND STORAGE DEVICE

(71) Applicant: Mitsubishi Electric Corporation, Tokyo (JP)

(72) Inventors: Takato Hirano, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 254 days.

(21) Appl. No.: 16/061,264

(22) PCT Filed: Jan. 15, 2016

(86) PCT No.: PCT/JP2016/051158
§ 371 (c)(1),
(2) Date: Jun. 11, 2018

(87) PCT Pub. No.: WO2017/122352
PCT Pub. Date: Jul. 20, 2017

(65) Prior Publication Data
US 2019/0036679 A1 Jan. 31, 2019

(51) Int. Cl.
*H04L 9/06* (2006.01)
*G09C 1/00* (2006.01)
*G06F 16/00* (2019.01)

(52) U.S. Cl.
CPC ............ *H04L 9/0631* (2013.01); *G06F 16/00* (2019.01); *G09C 1/00* (2013.01)

(58) Field of Classification Search
CPC .......... H04L 9/0631; G06F 16/00; G09C 1/00
See application file for complete search history.

(56) References Cited

U.S. PATENT DOCUMENTS

| 6,169,999 | B1 | 1/2001 | Kanno |
| 6,493,713 | B1 | 12/2002 | Kanno |

(Continued)

FOREIGN PATENT DOCUMENTS

| EP | 2960808 A1 | 12/2015 |
| JP | 4-340164 A | 11/1992 |

(Continued)

OTHER PUBLICATIONS

Chase et al., "Substring-Searchable Symmetric Encryption", Proceedings on Privacy Enhancing Technologies, vol. 2, 2015, pp. 263-281.

(Continued)

*Primary Examiner* — Samson B Lemma
*Assistant Examiner* — Zoha Piyadehghibi Tafaghodi
(74) *Attorney, Agent, or Firm* — Birch, Stewart, Kolasch & Birch, LLP

(57) ABSTRACT

A data partition unit partitions character string data D into N pieces of element data $w_1, w_2, \ldots, w_N$ from a front to an end of the character string data D. A partial character string generation unit generates a set $A=\{A_1, A_2, \ldots, A_N\}$ and an element $A_i=\{(w_i), (w_i w_{i+1}), \ldots, (w_i w_{i+1} \ldots w_N)\}$ of the set A where $i=1, \ldots, N$, from the element data $w_1, w_2, \ldots, w_N$. A position information assignment unit generates a set $B=\{B_1, B_2, \ldots, B_N\}$ and an element $B_i=\{(i, w_i), (i, w_i w_{i+1}), \ldots, (i, w_i w_{i+1} \ldots w_N)\}$ of the set B by associating each of $(w_i), (w_i w_{i+1}), \ldots, (w_i w_{i+1} \ldots w_N)$ which are components of the element $A_i$ with position information i. An encryption unit encrypts each of $(i, w_i), (i, w_i w_{i+1}), \ldots, (i, w_i w_{i+1} \ldots w_N)$ which are components included in the element $B_i$.

9 Claims, 24 Drawing Sheets

(56) References Cited

U.S. PATENT DOCUMENTS

| | | |
|---|---|---|
| 8,533,489 B2 | 9/2013 | Roeder et al. |
| 10,311,239 B2 | 6/2019 | Tanishima et al. |
| 2005/0102499 A1 | 5/2005 | Kosuga et al. |
| 2011/0302166 A1 | 12/2011 | Moriya et al. |
| 2012/0159180 A1 | 6/2012 | Chase et al. |
| 2013/0262863 A1 | 10/2013 | Yoshino et al. |
| 2013/0287210 A1 | 10/2013 | Matsuda et al. |
| 2013/0332729 A1 | 12/2013 | Ito et al. |
| 2014/0331044 A1 | 11/2014 | Fujii et al. |
| 2015/0046450 A1 | 2/2015 | Yoshino et al. |
| 2015/0371062 A1* | 12/2015 | Ito ................ G06F 21/6245 713/164 |
| 2015/0381578 A1* | 12/2015 | Thota ............. H04L 63/1408 713/168 |
| 2016/0048690 A1* | 2/2016 | Tanishima ........ G06F 21/602 713/193 |
| 2016/0335450 A1 | 11/2016 | Yoshino et al. |
| 2017/0026350 A1 | 1/2017 | Dawoud |
| 2017/0288858 A1 | 10/2017 | Hirano et al. |
| 2019/0036679 A1 | 1/2019 | Hirano et al. |

FOREIGN PATENT DOCUMENTS

| | | |
|---|---|---|
| JP | 4-340165 A | 11/1992 |
| JP | 10-334118 A | 12/1998 |
| JP | 2005-101883 A | 4/2005 |
| JP | 2005-134990 A | 5/2005 |
| JP | 2006-072585 A | 3/2006 |
| JP | 2006-113704 A | 4/2006 |
| JP | 2010-224655 A | 10/2010 |
| JP | 2012-123614 A | 6/2012 |
| JP | 2012-164031 A | 8/2012 |
| JP | 2013-152512 A | 8/2013 |
| JP | 2014-126621 A | 7/2014 |
| JP | 2015-035072 A | 2/2015 |
| JP | 2015-135541 A | 7/2015 |
| JP | 2016-143048 A | 8/2016 |
| JP | 6038427 B1 | 12/2016 |
| WO | WO 2010/047286 A1 | 4/2010 |
| WO | WO 2012-004880 A1 | 1/2012 |
| WO | WO 2012/095973 A1 | 7/2012 |
| WO | WO 2012/115031 A1 | 8/2012 |
| WO | WO 2013/080365 A1 | 6/2013 |
| WO | WO 2014/128958 A1 | 8/2014 |

OTHER PUBLICATIONS

Curtmola et al., "Searchable Symmetric Encryption: Improved Definitions and Efficient Constructions", Journal of Computer Security, vol. 19, 2011, pp. 895-934.

Hahn et al., "Searchable Encryption with Secure and Efficient Updates", Proceedings of the ACM Conference on Computer and Communications Security, 2014, pp. 310-320.

International Search Report for PCT/JP2016/051006 (PCT/ISA/210) dated Apr. 5, 2016.

International Search Report for PCT/JP2016/051158 (PCT/ISA/210) dated Apr. 12, 2016.

International Search Report for PCT/JP2016/079421 (PCT/ISA/210) dated Dec. 27, 2016.

International Search Report for PCT/JP2017/000679 (PCT/ISA/210) dated Apr. 4, 2017.

Li et al., "Fuzzy Keyword Search over Encrypted Data in Cloud Computing", Proceedings of IEEE INFOCOM, 2010, 5 pages.

Wang et al., "Achieving Usable and Privacy-assured Similarity Search over Outsourced Cloud Data", Proceedings of IEEE INFOCOM, 2012, pp. 451-459.

International Search Report dated Jun. 27, 2017, for International Application No. PCT/JP2017/016358.

U.S. Office Action, dated Apr. 24, 2020, for U.S. Appl. No. 16/063,457.

European Office Action, dated May 14, 2020, for European Application No. 17907937.1.

Extended European Search Report for European Application No. 16884955.2, dated Feb. 7, 2019.

International Search Report dated Jun. 27, 2019, for International Application No. PCT/JP2017/016358.

Extended European Search Report for European Application No. 17738450.0, dated Sep. 5, 2018.

Partial Supplementary European Search Report for European Application No. 16884955.2, dated Oct. 1, 2018.

Agrawal et al., "Searching with Numbers," Proceedings of the 11th International Conference on World Wide Web, ACM, Honolulu, Hawaii, May 7, 2002, XP058122195, pp. 420-431 (12 pages total).

Communication pursuant to Article 94(3) EPC for European Application No. 16884955.2, dated Jan. 14, 2020.

Extended European Search Report for European Application No. 17907937.1, dated Jan. 10, 2020.

Office Action dated Oct. 28, 2020 in Indian Application No. 201847024068, corresponding to co-pending U.S. Appl. No. 16/063,457.

Office Action dated Oct. 30, 2020 in corresponding Chinese Application No. 201680076736.4.

Office Action dated Nov. 25, 2020 in corresponding Indian Application No. 201847024269.

Summons to attend oral proceedings pursuant to Rule 115(1) EPC dated Dec. 14, 2020 in European Application No. 17 907 937.1 (corresponding to co-pending U.S. Appl. No. 16/490,445).

Office Action dated Feb. 19, 2021 in co-pending U.S. Appl. No. 16/490,445.

* cited by examiner

ENCRYPTION DEVICE, ENCRYPTION METHOD, COMPUTER READABLE MEDIUM, AND STORAGE DEVICE

TECHNICAL FIELD

The present invention relates to a search system, a management device, a registration device, a search device, a key generation device, a search method, a server program, and a terminal program. The invention relates to a searchable encryption system, for example.

BACKGROUND ART

Searchable encryption is a technique that allows searching while search target data and search content remain encrypted. In recent years, with the spread of cloud services and the like, data management on the Internet has become possible.

However, for the data management on the Internet, there are risks such that a server such as a cloud which is an outsourcing contractor of the data management may be infected with malware such as a computer virus, and that an administrator of the server may commit fraud, thereby leaking outsourced data to the outside. If the data outsourced to the server is personal information or confidential corporate data, this leakage is a serious problem.

There is an encryption technique as a method to avoid such security threats. However, if data is simply encrypted and stored in the server, there arises a problem that searching of the data cannot be performed.

In order to avoid such a problem, there has been devised a method in which when a search is performed, encrypted data stored on the server is once decrypted to then perform the search. However, the data returns to plaintext for a certain period of time in the server, so that this method cannot be regarded as adequate as a countermeasure.

Therefore, a "searchable encryption technique" which is a cryptographic technique that allows searching while data remains encrypted has been devised, and many specific methods of the searchable encryption technique have been disclosed in recent years.

In the searchable encryption technique, schemes that allow "exact match searching" which is simple searching (see Non-Patent Literature 1, for example) have been mainly considered. In recent years, schemes that allow more flexible searching, for example, "partial match searching" (see Patent Literature 1 and Non-Patent Literature 2, for example), schemes that allow "similarity searching" (see Non-Patent Literature 3 and Non-Patent Literature 4, for example), and the like have also been considered. Hereinafter, a scheme that allows partial match searching will be referred to as a "searchable encryption technique with partial matching", and a searchable encryption technique that allows similarity searching will be referred to as a "similarity searchable encryption technique". The searchable encryption technique is broadly divided into two types, schemes based on public-key cryptography such as an RSA cryptographic scheme (RSA is a registered trademark) and schemes based on common-key cryptography such as an AES cryptographic scheme.

CITATION LIST

Patent Literature

Patent Literature 1: JP 2014-126621 A

Non-Patent Literature

Non-Patent Literature 1: R. Curtmola, J. Garay, S. Kamara, and R. Ostrovsky. "Searchable Symmetric Encryption: Improved Definitions and Efficient Constructions". ACM CCS 2006.

Non-Patent Literature 2: M. Chase and E. Shen. "Substring-Searchable Symmetric Encryption", PETS 2015.

Non-Patent Literature 3: J. Li, Q. Wang, C. Wang, N. Cao, K. Ren, and W. Lou. "Fuzzy Keyword Search over Encrypted Data in Cloud Computing", Mini-Conference at IEEE Infocom 2010.

Non-Patent Literature 4: C. Wang, K. Ren, S. Yu, and K. M. R. Urs. "Achieving Usable and Privacy-assured Similarity Search over Outsourced Cloud Data", IEEE Infocom 2012.

SUMMARY OF INVENTION

Technical Problem

Existing high-speed searchable encryption techniques with partial matching based on common-key cryptographic techniques such as AES, HMAC, and SHA-256 have the following problems.

Patent Literature 1 discloses a technique in which data is partitioned into pieces, each composed of a few characters, to be individually encrypted, thereby achieving partial match searching while the data remains encrypted. For example, the data is partitioned into one-character or two-character pieces and then encrypted.

However, if the data is partitioned into pieces, each composed of a small number of characters, there is a possibility that there may appear a large number of identical pieces of partitioned data. This technique employs a deterministic encryption scheme which always generates the same ciphertext from the same data, so that encrypting the same partitioned data generates exactly the same ciphertext. Thus, there is a problem that it is vulnerable to a frequency analysis attack.

Note that the frequency analysis attack is an attack method in which frequencies of ciphertexts having the same values are matched with public information on frequencies (for example, such as a distribution of Japanese surnames), thereby inferring original data from a ciphertext without using a key used for encryption.

In order to avoid receiving such an attack, it may be considered to use a probabilistic encryption scheme which transforms the same data into different characters each time. However, when such an encryption scheme is used in this technique, there is a problem that searching cannot be performed.

As another countermeasure, it may be considered to increase the number of characters in each piece of partitioned data. In that case, however, there is a problem that partial match searching is difficult.

Non-Patent Literature 2 discloses a searchable encryption technique with partial matching which is not vulnerable to the frequency analysis attack as described above, and which can reduce the size of encrypted data to be stored using a certain tree structure (hereinafter referred to as storage encrypted data). However, in this technique, the size of encrypted data used for searching (hereinafter referred to as search encrypted data) becomes large, and a large number of interactions between a user and a server occur in searching, so that there is a problem in the communication volume.

Non-Patent Literature 3 and Non-Patent Literature 4 disclose similarity searchable encryption techniques including partial match searching. These techniques allow more flexible searching than partial match searching. However, there is a problem that the sizes of both storage encrypted data and search encrypted data are large.

It is an object of the present invention to provide a searchable encryption technique with partial matching while achieving high security so as to be resistant to an attack such as frequency analysis, and reducing the data size and the communication volume.

Solution to Problem

An encryption device according to the present invention includes:

a data partition unit to partition character string data D into N pieces of element data $w_1, w_2, \ldots, w_N$ from a front to an end of the character string data D;

a partial character string generation unit to generate a set $A=\{A_1, A_2, \ldots, A_N\}$ and an element $A_i=\{(w_i), (w_i w_{i+1}), \ldots, (w_i w_{i+1} \ldots w_N)\}$ of the set A, where $i=1, \ldots, N$, from the N pieces of element data $w_1, w_2, \ldots, w_N$;

a position information assignment unit to generate a set $B=\{B_1, B_2, \ldots, B_N\}$ and an element $B_i=\{(i, w_i), (i, w_i w_{i+1}), \ldots, (i, w_i w_{i+1} \ldots w_N)\}$ of the set B by associating each of $(w_i), (w_i w_{i+1}), \ldots,$ and $(w_i w_{i+1} \ldots w_N)$ which are components of the element $A_i$ with position information i; and an encryption unit to encrypt each of $(i, w_i), (i, w_i w_{i+1}), \ldots,$ and $(i, w_i w_{i+1} \ldots w_N)$ which are components included in the element $B_i$.

Advantageous Effects of Invention

According to the present invention, a partial character string constituting character string data which is storage data is encrypted by adding position information, so that comparison of ciphertexts of character string data, which is important in performing a frequency analysis attack, cannot be performed. Thus, security against the frequency analysis attack can be improved.

DESCRIPTION OF EMBODIMENTS

Embodiments of the present invention will be described hereinafter with reference to the drawings. Throughout the drawings, like or corresponding parts are denoted by like reference sings. In the description of the embodiments, the description of like or corresponding parts will be omitted or simplified as appropriate.

First Embodiment

In this embodiment, a highly secure and efficient searchable encryption technique with partial matching will be disclosed.

An overview of this embodiment will be described below.

Figure 1:
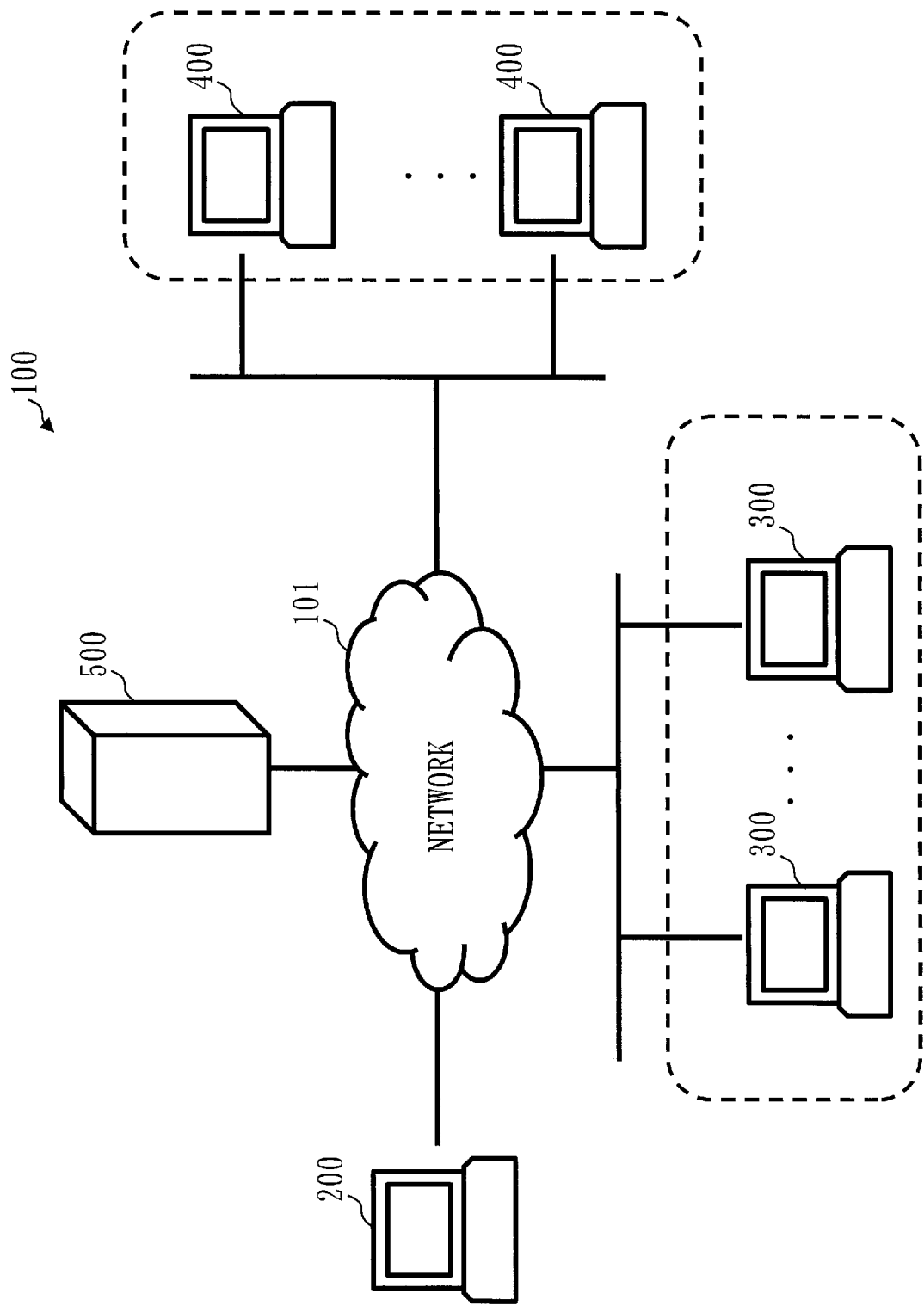
FIG. 1 is a diagram of a first embodiment and is a block diagram illustrating a configuration of a searchable encryption system.

FIG. 1 is a block diagram illustrating a configuration of a searchable encryption system 100 according to this embodiment. As illustrated in FIG. 1, the searchable encryption system 100 includes a key generation device 200, a plurality of registration devices 300, a plurality of search devices 400, and a management device 500.

<*Description of Configuration*>

The searchable encryption system 100 may include a plurality of key generation devices 200. The searchable encryption system 100 may include only one registration device 300. The searchable encryption system 100 may include only one search device 400. The searchable encryption system 100 may include a plurality of management devices 500. The searchable encryption system 100 may be installed within a local area network (LAN) provided in the same company, instead of being connected with each of the key generation device 200, the plurality of registration devices 300, the plurality of search devices 400, and the management device 500 via Internet 101. The Internet 101 is a communication channel connecting the key generation device 200, the plurality of registration devices 300, the plurality of search devices 400, and the management device 500. The Internet 101 is an example of a network. In place of the Internet 101, a network of another type may be used.

The key generation device 200 creates a key to be used for encryption, and transmits the key via the Internet 101 to the plurality of registration devices 300 and the plurality of search devices 400. The key may be transmitted directly to the plurality of registration devices 300 and the plurality of search devices 400 by mail or the like, instead of via the Internet 101.

The registration device 300 is a personal computer, for example. The registration device 300 is a computer that operates as a registration terminal to register storage encrypted data in the management device 500. The registration device 300 functions as an encryption device and a registration device. That is, the registration device 300 generates storage encrypted data, and requests the management device 500 to store the storage encrypted data. The registration device 300 functions as a deletion request device. That is, the registration device 300 requests the management device 500 to delete the stored storage encrypted data.

The search device 400 is a personal computer, for example. The search device 400 is a computer that transmits search encrypted data to the management device 500, and then receives an encrypted-search result from the management device 500 and outputs the encrypted-search result. The search device 400 functions as a search request device. That is, the search device 400 transmits the search encrypted data to the management device 500, and requests matching of the search encrypted data against the storage encrypted data. The search device 400 functions as an output device. That is, the search device 400 outputs a search result returned from the management device 500.

The management device 500 is a device having a high-capacity recording medium to store the storage encrypted data created by the registration device 300. The management device 500 functions as a storage device. That is, when being requested by the registration device 300 to store the storage encrypted data, the management device 500 stores the storage encrypted data. The management device 500 functions as a search device. That is, when a search is requested by the search device 400, the management device 500 matches the search encrypted data against the storage encrypted data, and transmits a search result to the search device 400. The management device 500 functions as a deletion device. That is, when requested by the registration device 300 to delete the storage encrypted data, the management device 500 deletes the stored storage encrypted data.

Any combination of the key generation device 200, the registration device 300, and the search device 400 may be included together in the same personal computer.

Both the storage encrypted data and the search encrypted data have been encrypted. It is difficult for those without the key other than the registration device 300 and the search device 400 to obtain useful information from the storage encrypted data and the search encrypted data.

Configurations of this embodiment will be described below.

As illustrated in FIG. 1, the searchable encryption system 100 includes the key generation device 200, the registration devices 300, the search devices 400, and the management device 500.

A configuration of the key generation device 200, a configuration of the registration device 300, a configuration of the search device 400, and a configuration of the management device 500 will be sequentially described below.

Figure 2:
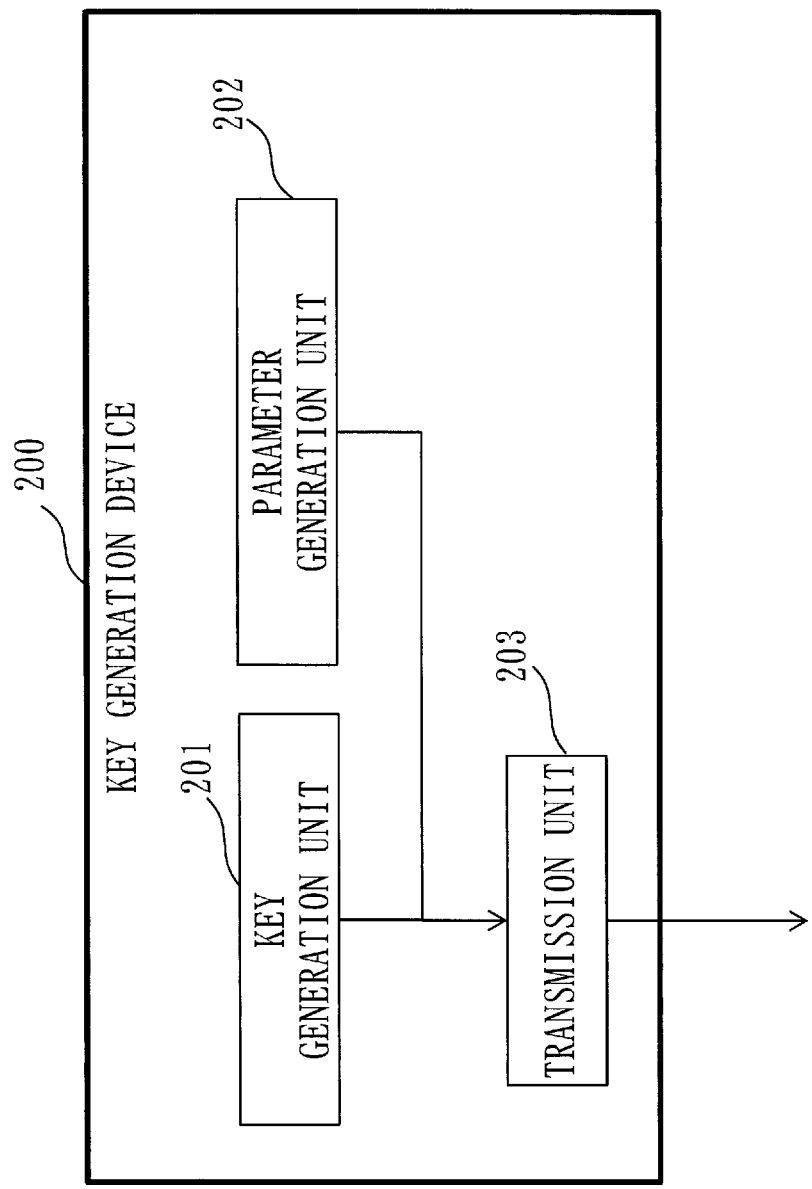
FIG. 2 is a diagram of the first embodiment and is a block diagram illustrating a configuration of a key generation device.

FIG. 2 is a block diagram illustrating the configuration of the key generation device 200. As illustrated in FIG. 2, the key generation device 200 includes a key generation unit 201, a parameter generation unit 202, and a transmission unit 203. Although not illustrated, the key generation device 200 includes a recording medium to store data used in each unit of the key generation device 200.

The key generation unit 201 generates a key K for encrypting and decrypting data. The key K is secret information to be stored in the registration device 300 and the search device 400, so that it is generated strictly. The description is given herein using a common-key cryptographic technique, but a public-key cryptographic technique may also be used.

The parameter generation unit 202 generates a parameter required for encryption of data and matching of data. For example, the parameter may be a maximum length L in partitioning registration data into some character strings. Note that L is an integer larger than 0. Also note that L is not secret information, so that it may be disclosed publicly.

The transmission unit 203 transmits the key K generated by the key generation unit 201 to the registration device 300 and the search device 400, and transmits the parameter L generated by the parameter generation unit 202 to the registration device 300 and the management device 500.

Figure 3:
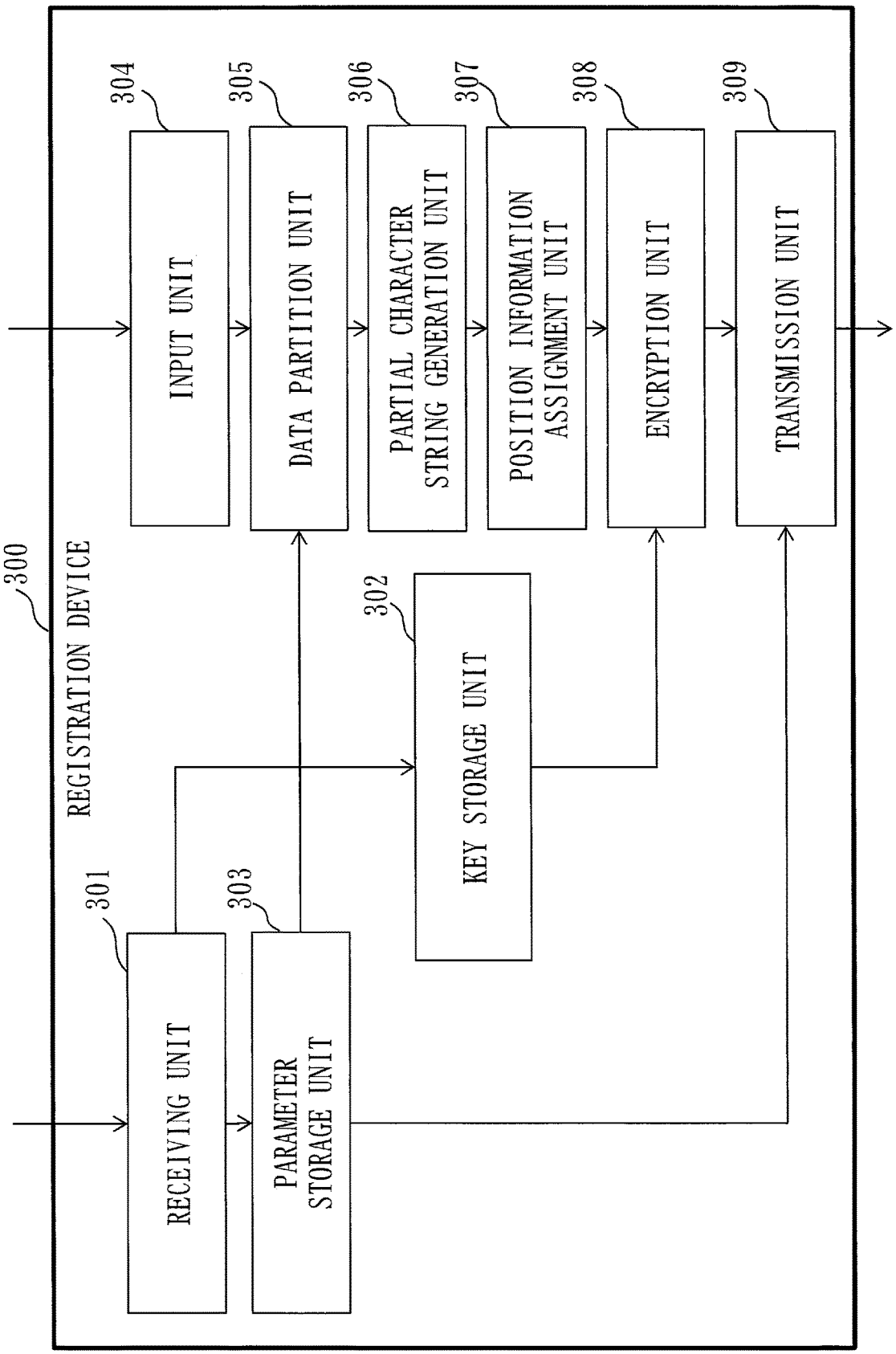
FIG. 3 is a diagram of the first embodiment and is a block diagram illustrating a configuration of a registration device.

FIG. 3 is a block diagram illustrating the configuration of the registration device 300. As illustrated in FIG. 3, the registration device 300 includes a receiving unit 301, a key storage unit 302, a parameter storage unit 303, an input unit 304, a data partition unit 305, a partial character string generation unit 306, a position information assignment unit 307, an encryption unit 308, and a transmission unit 309. Although not illustrated, the registration device 300 includes a recording medium to store data used in each unit of the registration device 300.

The receiving unit 301 receives the key K and the parameter L transmitted from the key generation device 200. The key storage unit 302 stores the key K received from the receiving unit 301. The parameter storage unit 303 stores the parameter L received from the receiving unit 301.

The input unit 304 receives storage data and a data name which are input by a data registrant. In this embodiment, the storage data is described as D and the data name is described as ID(D). If no data name is input by the data registrant, the input unit 304 may assign a random number to the data name ID(D) of the input storage data D, or may assign an integer value greater than 0 sequentially such that it does not overlap with data names of other pieces of storage data. The data name ID(D) is an identifier to identify the storage data D.

The input unit 304 receives from the data registrant a deletion data name concerning the storage encrypted data to be deleted. The deletion data name may be any name as long as it allows the storage data to be identified, such as a data name that has been input at registration, a time of the registration, a name of the data registrant, or the like, for example.

The data partition unit 305 reads out the parameter L from the parameter storage unit 303, and partitions the storage data D received from the input unit 304 as $(w_1, \ldots, w_L)$.

Note that each wi ($1 \le i \le L$) may be obtained by sequentially partitioning the data into one-character pieces or plural-character pieces, or may be obtained by partitioning the data on a per-word basis. The data D may be partitioned as $(w_1, \ldots, w_k)$ such that $k \le L$. If the number of partitions is less than L in whatever way the data is partitioned, it may remain less than L, or the length may be adjusted to L by supplementing the number of characters that are lacking with a special character such as "*" or a null. In the following description, the number of partitions is L, but approximately the same procedure may be performed even when it is less than L.

The partial character string generation unit 306 generates a set A as indicated below from the partitioned data $(w_1, \ldots, w_L)$ received from the data partition unit 305.

$A = \{\{(w_1), (w_1 w_2), \ldots, (w_1 \ldots w_L)\}, \{(w_2), (w_2 w_3), \ldots, (w_2 \ldots w_L)\}, \ldots, \{(w_L)\}\}$ The set A will hereinafter be referred to as a partial character string set.

The position information assignment unit 307 assigns position information to each partial character string in the partial character string set A received from the partial character string generation unit 306, as indicated below, to generate a set B.

$B = \{(1, w_1), (1, w_1 w_2), \ldots, (1, w_1 \ldots w_L)\}, \{(2, w_2), (2, w_2 w_3), \ldots (2, w_2 \ldots w_L)\}, \ldots, \{(L, w_L)\}\}$ The set B will hereinafter be referred to as a partial character string set with position information.

The encryption unit 308 reads out the key K from the key storage unit 302, and generates a ciphertext C for each partial character string with position information in the partial character string set B with position information received from the position information assignment unit 307, as indicated below. For each pair (p, w) of position information and a partial character string, $C = E(E(K, w), p, ID(D))$ is generated.

Note that E is an encryption function. Examples thereof include a common-key cryptographic scheme such as AES, a message authentication code such as HMAC, and a hash function such as SHA-256.

A set of ciphertexts obtained by encrypting all (p, w) will be denoted as C(D).

A pair (ID(D), C(D)) will hereinafter be referred to as a storage encrypted data set.

The transmission unit 309 transmits the storage encrypted data set (ID(D), C(D)) received from the encryption unit 308 to the management device 500. The transmission unit 309 transmits the deletion data name received from the input unit 304 to the management device 500.

Figure 4:
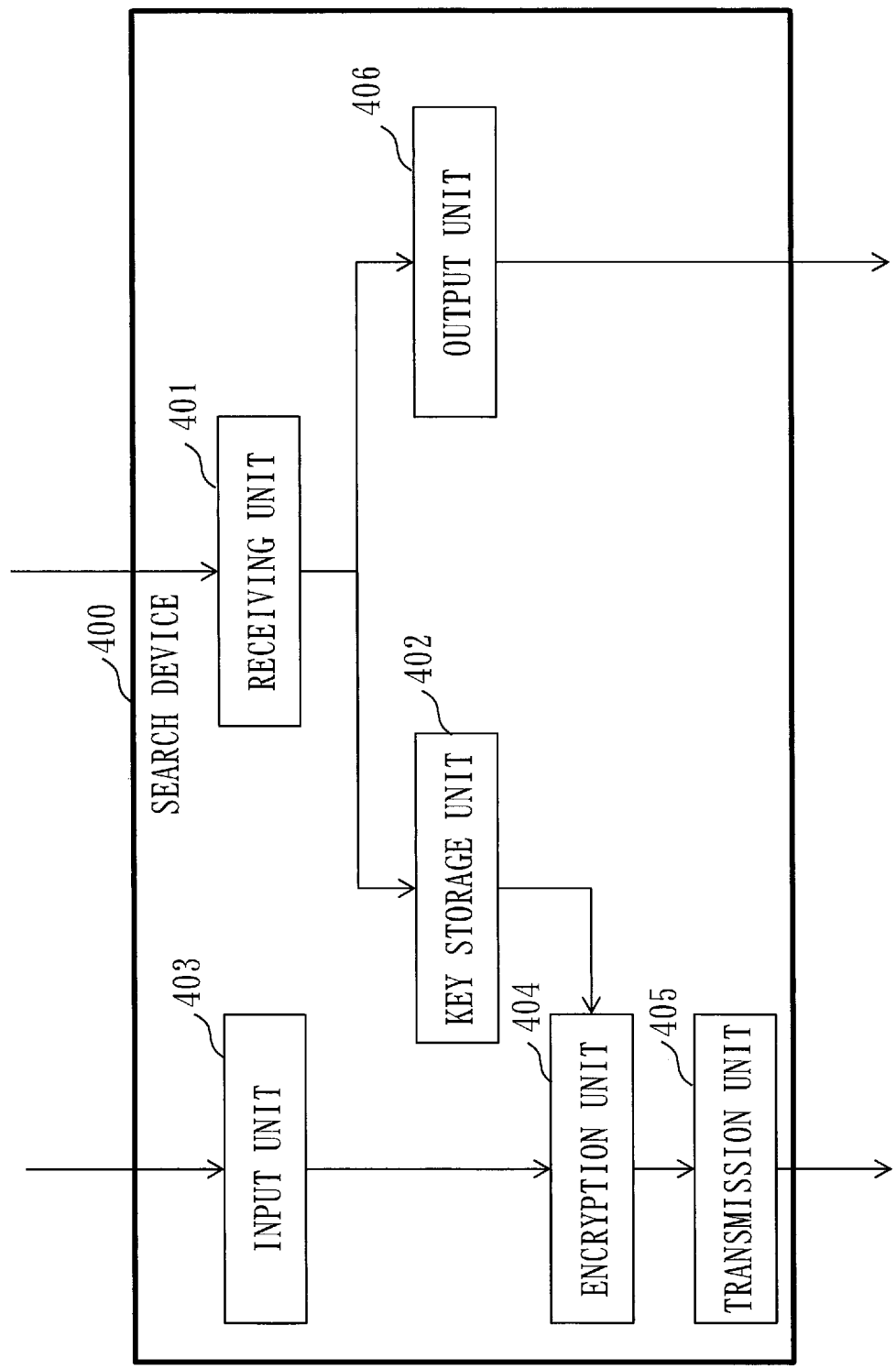
FIG. 4 is a diagram of the first embodiment and is a block diagram illustrating a configuration of a search device.

FIG. 4 is a block diagram illustrating the configuration of the search device 400. As illustrated in FIG. 4, the search device 400 includes a receiving unit 401, a key storage unit 402, an input unit 403, an encryption unit 404, a transmission unit 405, and an output unit 406. Although not illustrated, the search device 400 includes a recording medium to store data used in each unit of the search device 400.

The receiving unit 401 receives the key K transmitted from the key generation device 200 or a search result transmitted from the management device 500. The key storage unit 402 stores the key K received from the receiving unit 401. The input unit 403 receives search data s input by a data searcher. Together with the search data, the input unit 403 may also receive from the data searcher a plurality of storage data names to specify the storage encrypted data sets to be searched with the search data.

The encryption unit 404 reads out the key K from the key storage unit 402, and generates a ciphertext t for the search data s received from the input unit 403, as indicated below, using the key K.

$t = E(K, s)$

This t will hereinafter be referred to as search encrypted data.

The transmission unit 405 transmits the search encrypted data t received from the encryption unit 404 to the management device 500. If a storage data name has also been input by the data searcher together with the search data, both the search encrypted data and the storage data name are transmitted to the management device 500.

Based on the search result received from the receiving unit 401, the output unit 406 outputs the search result to the data searcher. If the search result has been encrypted, the search result is decrypted with the key K stored in the key storage unit 402 or the like and then is output.

Figure 5:
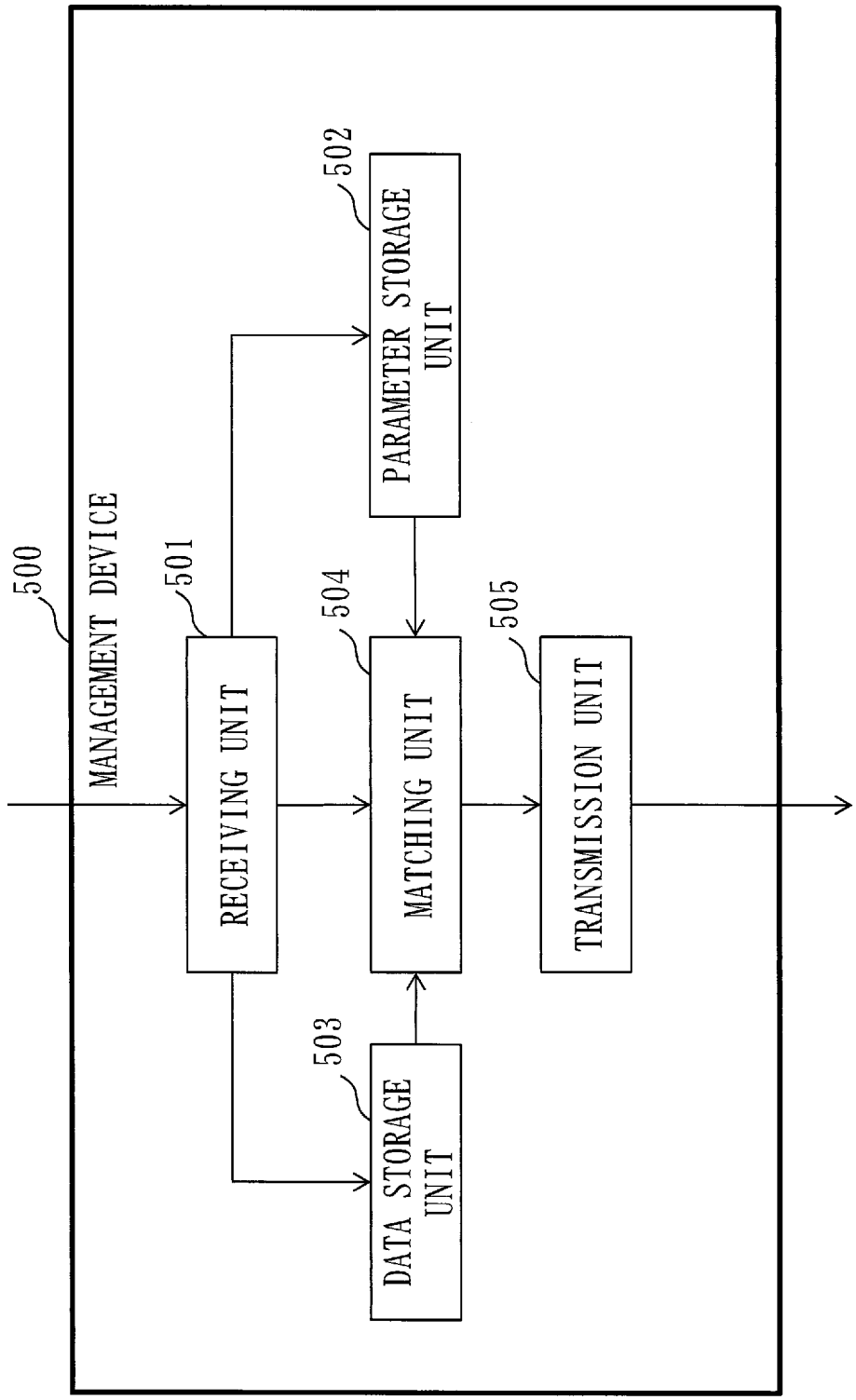
FIG. 5 is a diagram of the first embodiment and is a block diagram illustrating a configuration of a management device.

FIG. 5 is a block diagram illustrating the configuration of the management device 500. As illustrated in FIG. 5, the management device 500 includes a receiving unit 501, a parameter storage unit 502, a data storage unit 503, a matching unit 504, and a transmission unit 505. Although not illustrated, the management device 500 includes a recording medium to store data used in each unit of the management device 500.

The receiving unit 501 receives the parameter L transmitted from the key generation device 200, the storage encrypted data set (ID(D), C(D)) and the deletion data name transmitted from the registration device 300, and the search encrypted data t and the storage data name transmitted from the search device 400.

The parameter storage unit 502 stores the parameter L received from the receiving unit 501.

The data storage unit 503 stores the storage encrypted data set (ID(D), C(D)) received from the receiving unit 501. If necessary, a date and time of transmission may also be stored at the same time.

The data storage unit 503 deletes the stored storage encrypted data set, based on the deletion data name received from the receiving unit 501.

The matching unit 504 generates an empty set R concerning a search result, reads out all the storage encrypted data sets (ID(D), C(D)) from the data storage unit 503, and performs matching and generates a search result as described below, based on the search encrypted data t received from the receiving unit 501.

The matching unit 504 calculates $T1 = E(t, 1, ID(D)), \ldots, TL = E(t, L, ID(D))$, and checks whether each Tp ($1 \le p \le L$) is included in C(D).

If Tp is included in C(D), the pair (ID(D), p) is added to R.

This (ID(D), p) signifies that "the search data appears at the p-th position in ID(D)". Each Tp will hereinafter be referred to as matching data, and $\{T1, \ldots, TL\}$ will be referred to as a matching data set.

A set R that is finally generated as a result of this process will be referred to as a search result.

If the receiving unit 501 has also received a storage data name from the search device 400, the matching unit 504 reads out only the target storage encrypted data set from the data storage unit 503 based on that storage data name, and performs substantially the same process.

The transmission unit 505 transmits the search result R received from the matching unit 504 to the search device 400.

The operation of the searchable encryption system 100 which is equivalent to an encryption method and a search method according to this embodiment will be described below.

Figure 6:
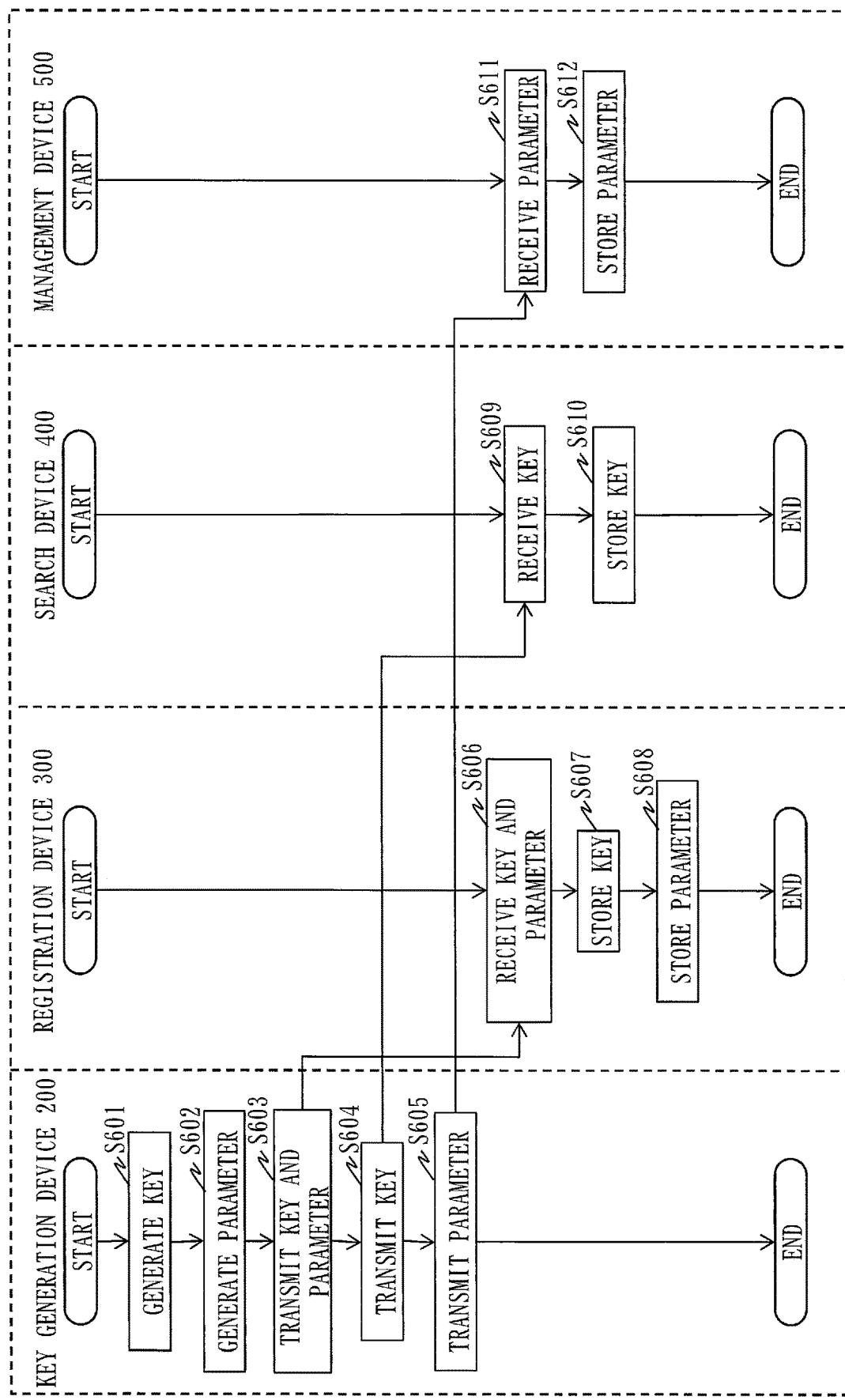
FIG. 6 is a diagram of the first embodiment and is a flowchart illustrating a key generation and storage process of the searchable encryption system.

FIG. 6 is a flowchart illustrating a key generation and storage process of the searchable encryption system 100. Step S601 to Step S612 of FIG. 6 are steps executed by the key generation device 200, the registration device 300, the search device 400, and the management device 500. Step S601 to Step S605 are executed by the key generation device 200. Step S606 to Step S608 are executed by the registration device 300. Step S609 to Step S610 are executed by the search device 400. Step S611 to Step S612 are executed by the management device 500.

Step numbers such as Step S601 will hereinafter be denoted as S601 and the like. The same also applies to Step numbers in FIG. 7 to FIG. 9, FIG. 15 to FIG. 17 of the second embodiment, and FIG. 22 to FIG. 24 of the third embodiment.

In S601, the key generation unit 201 generates a key K for encrypting data. This specification is described using a common-key cryptographic technique, but a public-key cryptographic technique may also be used. In that case, the key generation unit 201 may set a pair of a public key PK and a secret key SK as the key K, and perform the following process in the same way.

In S602, the parameter generation unit 202 generates a parameter L. As described above, L is the maximum number of character strings that appear when storage data is partitioned.

In S603, the transmission unit 203 transmits the key K generated in S601 and the parameter L generated in S602 to the registration device 300.

In S604, the transmission unit 203 transmits the key K generated in S601 to the search device 400.

In S605, the transmission unit 203 transmits the parameter L generated in S602 to the management device 500.

In S606, the receiving unit 301 receives the key K and the parameter L transmitted in S603.

In S607, the key storage unit 302 stores the key K received in S606 in a storage medium.

In S608, the parameter storage unit 303 stores the parameter L received in S606 in the storage medium.

In S609, the receiving unit 401 receives the key K transmitted in S604.

In S610, the key storage unit 402 stores the key K received in S609 in a storage medium.

In S611, the receiving unit 501 receives the parameter L transmitted in S605.

In S612, the parameter storage unit 502 stores the parameter L received in S611 in the storage medium. S612 completes the key generation and storage process of the searchable encryption system 100. The key K is secret information, so that the key storage unit 302 and the key storage unit 402 need to store the key K strictly to prevent it from being leaked to the outside.

Figure 7:
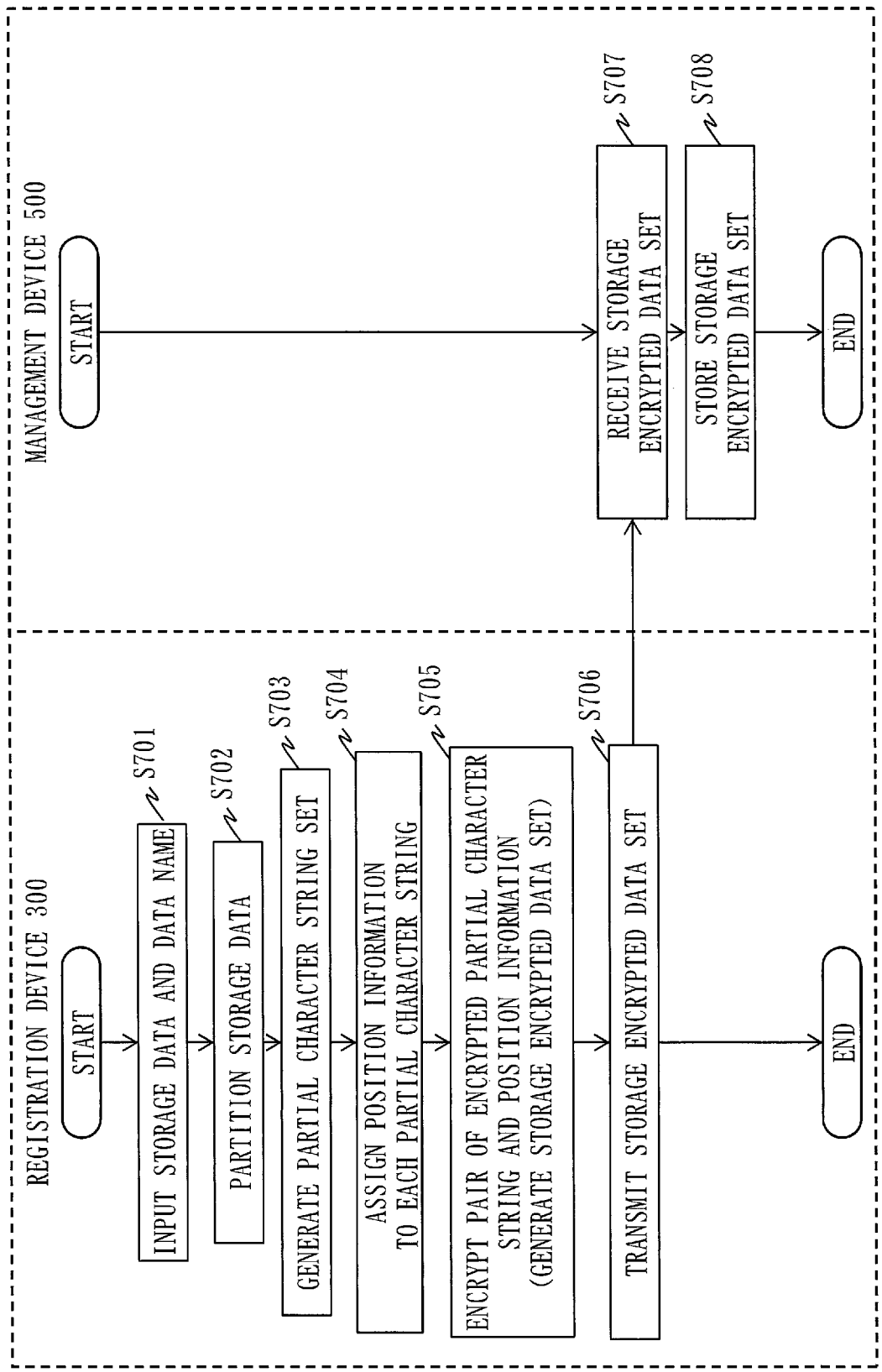
FIG. 7 is a diagram of the first embodiment and is a flowchart illustrating a data registration process of the searchable encryption system.

FIG. 7 is a flowchart illustrating a registration process of the searchable encryption system 100. S701 to S708 of FIG. 7 are steps executed by the registration device 300 and the management device 500. S701 to S706 are steps executed by the registration device 300. S707 to S708 are steps executed by the management device 500.

In S701, the input unit 304 receives storage data D and a data name ID(D) which are input by a data registrant. As described above, if no data name is input by the data registrant, the input unit 304 may assign a random number to the data name ID(D) of the input storage data D, or may assign an integer value greater than 0 sequentially such that it does not overlap with data names of other pieces of storage data.

In S702, the data partition unit 305 reads out the parameter L from the parameter storage unit 303, and partitions the storage data D received from the data registrant in S 701 as $(w_i, \ldots, w_L)$.

As described above, each $w_i$ ($1 \le i \le L$) may be obtained by sequentially partitioning the data into one-character pieces or plural-character pieces, or may be obtained by partitioning the data on a per-word basis. The data D may be partitioned as $(w_1, \ldots, w_k)$ such that $_k \le L$.

If the number of partitions is less than L in whatever way the data is partitioned, it may remain less than L, or the number of characters that are lacking may be supplemented with a special character such as "*" or a null.

When $w_i$ is referred to as element data, the data partition unit 305 partitions the storage data D which is character string data into N pieces of element data $w_1, \ldots, w_N$ from the front to the end of the storage data D. Note that N is equal to or less than L.

In the following S703 and thereafter, a case where the storage data D is partitioned into L pieces will be described. In a case where the storage data D is partitioned into N pieces, L may be interpreted as N in the following description.

In S703, the partial character string generation unit 306 generates a partial character string set A as indicated below from the partitioned data $(w_1, \ldots, w_L)$ generated in S702.

$A = \{A_1, A_2, \ldots, A_L\}$

An element $A_1$ and the like of the set A will be denoted as $A_i$ (i=1, ..., L).

The elements of the set A are as follows.

The elements of the set A are $A_1 = \{(w_1), (w_1 w_2), \ldots, (w_1 \ldots w_L)\}$, $A_2 = \{(w_2), (w_2 w_3), \ldots, (w_2 \ldots w_L)\}$, ..., and $A_L = \{(w_L)\}$.

Each element is $A_i = \{(w_i), (w_i w_{i+1}), \ldots, (w_i \ldots w_L)\}$ (i=1, ..., L).

An element of the element $A_i$ may hereinafter be referred to as a component. That is, $A_i$ has $(w_i), (w_i w_{i+1}), \ldots, (w_i \ldots w_L)$ which are the (L−i+1) number of components.

In S704, the position information assignment unit 307 assigns position information to each partial character string in the partial character string set A generated in S703, as indicated below, to generate a partial character string set B with position information.

Set B={B$_1$, B$_2$, ..., B$_L$}

Element B$_i$={(i, w$_i$), (i, w$_i$w$_{i+1}$), ..., (i, w$_i$w$_{i+1}$ ... w$_L$)} of the set B The element B$_i$ is generated by adding position information i to each component of the element A$_i$. Note that {i} the position information i is the suffix {i} in the element A$_i$.

When described specifically, the element B$_i$ is as follows.

$$B_1 = \{(1, w_1), (1, w_1w_2), \ldots, (1, w_1 \ldots w_L)\},$$
$$B_2 = \{(2, w_2), (2, w_2w_3), \ldots, (2, w_2 \ldots w_L)\},$$
$$\ldots$$
$$B_L = \{(L, w_L)\}$$

Each element of the set B is as follows.

B$_i$={(i, w$_i$), (i, w$_i$w$_{i+1}$), ..., (i, w$_i$ ... w$_L$)} (i=1, ..., L)

(i, w$_i$), (i, w$_i$w$_{i+1}$), ..., (i, w$_i$ ..., w$_L$) which are elements of B$_i$ may hereinafter be referred to as components.

In this way, the position information assignment unit 307 generates the partial character string set B with position information having the element B$_i$ (i=1, ..., L) by associating each of (w$_i$), (w$_i$w$_{i+1}$), ..., (w$_i$w$_{i+1}$ ... w$_L$) which are components of the element A$_i$ of the set A with the position information i.

In S705, the encryption unit 308 reads out the key K from the key storage unit 302, and generates a ciphertext C of each partial character string with position information in the partial character string set B with position information generated in S704, as indicated below.

For each pair (p, w) of position information and a partial character string, the following is generated.

$$C = E(E(K, w), p, ID(D)) \quad \text{(Expression 1)}$$

When explained using B$_i$, the pair (p, w) is each of the (L−i+1) number of components which are (i, w$_i$), (i, w$_i$w$_{i+1}$), ..., (i, w$_i$ ... w$_L$). In the case of (i, w$_i$), p=i and w=w$_i$.

A set of ciphertexts obtained by encrypting all (p, w) is denoted as C(D), and a storage encrypted data set (ID(D), C(D)) is generated.

That is, C(D) is information obtained by encrypting all of the components of $$B_1 = \{(1, w_1), (1, w_1w_2), \ldots, (1, w_1 \ldots w_L)\},$$
$$B_2 = \{(2, w_2), (2, w_2w_3), \ldots, (2, w_2 \ldots w_L)\},$$
$$\ldots, \text{and}$$
$$B_L = \{(L, w_L)\}.$$

In this way, the encryption unit 308 encrypts each of (i, w$_i$), (i, w$_i$w$_{i+1}$), ..., (i, w$_i$w$_{i+1}$ ... w$_L$) included in the element B$_i$.

As indicated in Expression 1 above, when encrypting each component included in the element B$_i$, the encryption unit 308 encrypts each component included in the element B$_i$ together with the data name ID(D) which is an identifier to identify the storage data D which is character string data.

As described above, E is the encryption function. Examples thereof include the common-key cryptographic scheme such as AES, the message authentication code such as HMAC, and the hash function such as SHA-256.

In S706, the transmission unit 309 transmits the storage encrypted data set (ID(D), C(D)) generated in S705 to the management device 500.

In S707, the receiving unit 501 receives the storage encrypted data set (ID(D), C(D)) transmitted in S706.

In S708, the data storage unit 503 stores the storage encrypted data set (ID(D), C(D)) received in S707.

S708 completes the registration process of the searchable encryption system 100.

Figure 8:
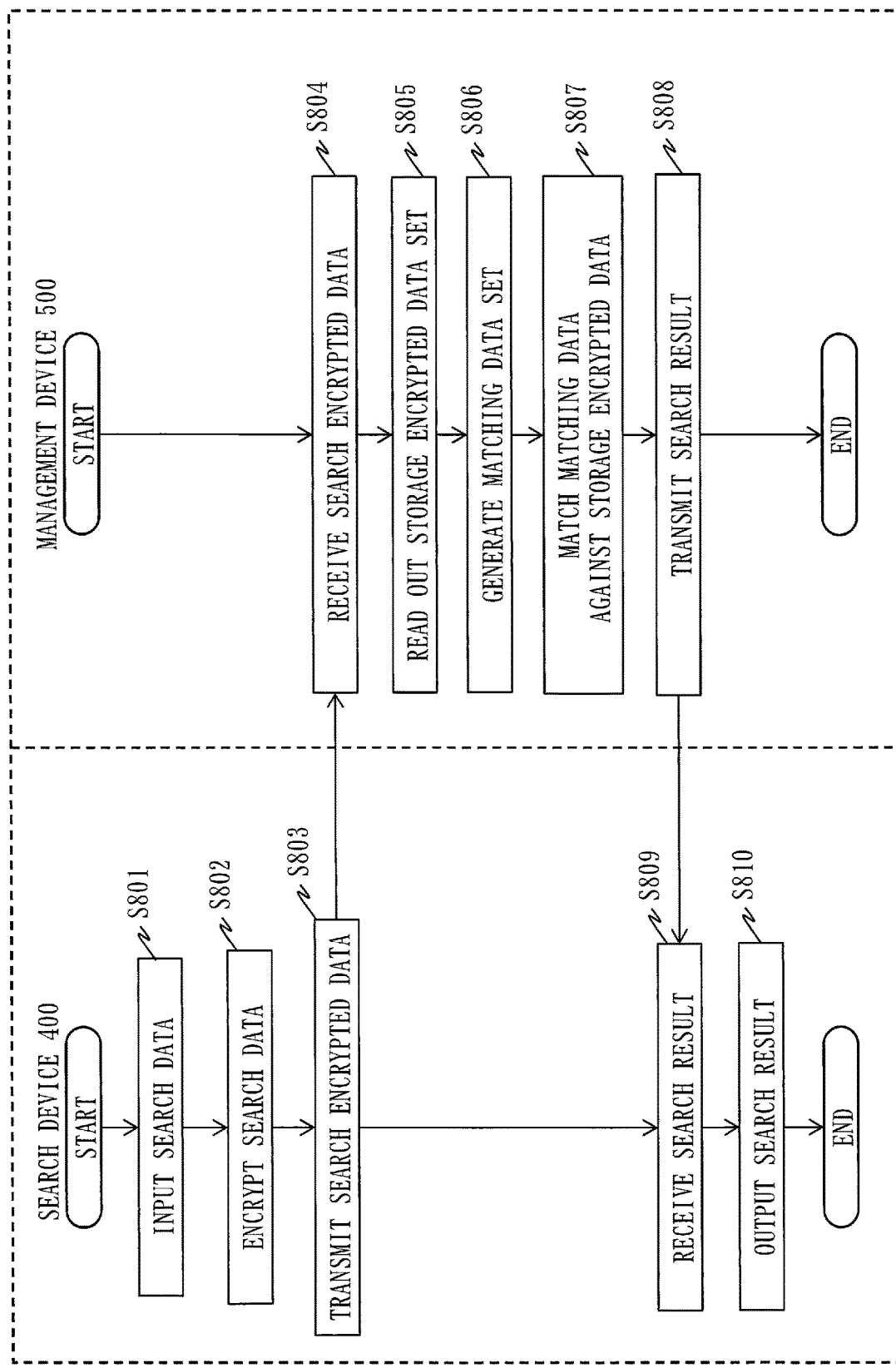
FIG. 8 is a diagram of the first embodiment and is a flowchart illustrating a data search process of the searchable encryption system.

FIG. 8 is a flowchart illustrating a search process of the searchable encryption system 100. S801 to S810 of FIG. 8 are steps executed by the search device 400 and the management device 500. S801 to S803 and S809 to S810 are steps executed by the search device 400. S804 to S808 are steps executed by the management device 500.

In S801, the input unit 403 receives search data s input by a data searcher. A plurality of pieces of search data may be received at the same time. In that case, the following process is performed in the same way for each piece of the search data. As described above, together with the search data, the input unit 403 may receive from the data searcher a plurality of storage data names to specify the storage encrypted data to be searched with that search data.

In S802, the encryption unit 404 reads out the key K from the key storage unit 402, and generates search encrypted data t for the search data s received in S801, as indicated below, using the key K. Note that t=E(K, s).

In S803, the transmission unit 405 transmits the search encrypted data t generated in S802 to the management device 500. If a storage data name has also been input in S801, the storage data name is also transmitted at the same time.

In S804, the receiving unit 501 receives the search encrypted data t transmitted in S803. If the storage data name has also been transmitted in S803, the storage data name is also received.

In S805, the matching unit 504 reads out the storage encrypted data set (ID(D), C(D)) from the data storage unit 503. If the storage data name has also been received in S804, only the target storage encrypted data set is read out based on that storage data name. If no storage data name has been received in S804, all the stored storage encrypted data sets are read out.

In S806, the matching unit 504 reads out the parameter L from the parameter storage unit 502, and based on ID(D) of the storage encrypted data set (ID(D), C(D)) read out in S805, generates each piece of matching data Tp ($1 \leq p \leq L$) for ID(D) from the search encrypted data t received in S804.

Note that each Tp is as follows.

T1=E(t, 1, ID(D)), ..., TL=E(t, L, ID(D))

If a plurality of storage encrypted data sets have been read out in S805, matching data corresponding to each ID(D) is generated.

In S807, the matching unit 504 generates an empty set R concerning a search result, and checks whether each piece of matching data Tp ($1 \leq p \leq L$) generated in S806 is included in C(D). If Tp is included in C(D), the pair (ID(D), p) is added to R. If a plurality of matching data sets have been generated in S806, each pair concerning the search result described above is added to the same R.

In S808, the transmission unit 505 transmits the search result R generated in S807 to the search device 400.

In S809, the receiving unit 401 receives the search result R transmitted in S808.

In S810, the output unit 406 provides output with regard to the search result R received in S809 to the data searcher as described below. For each (ID(D), p) included in the search result R, "the search data appears at the p-th position in ID(D)" is output. If R is an empty set, "the search data is not included in any data" is output. S810 completes the search process of the searchable encryption system 100.

Figure 9:
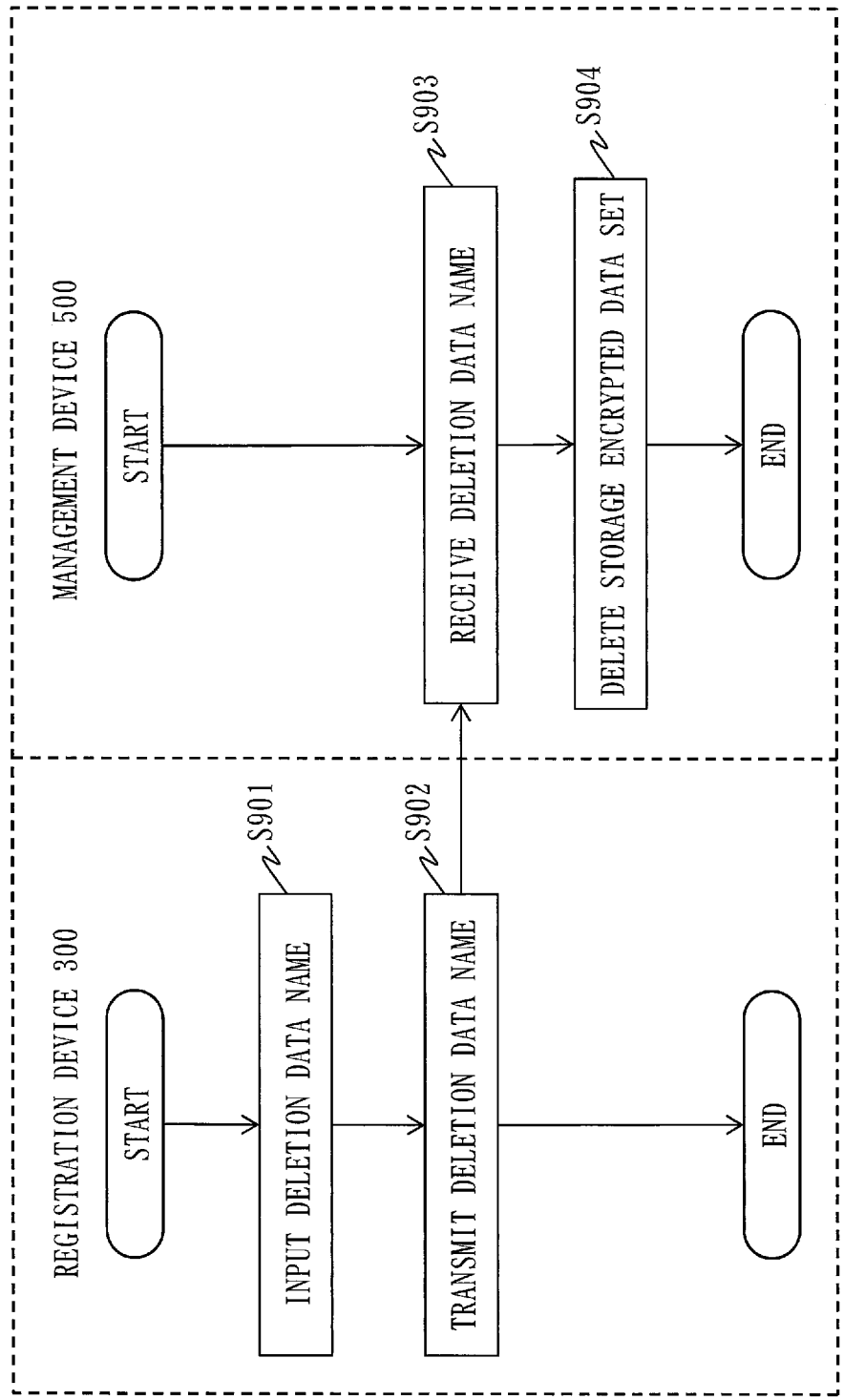
FIG. 9 is a diagram of the first embodiment and is a flowchart illustrating a data deletion process of the searchable encryption system.

FIG. 9 is a flowchart illustrating a deletion process of the searchable encryption system 100. S901 to S904 of FIG. 9 are steps executed by the registration device 300 and the management device 500. S901 to S902 are steps executed by the registration device 300. S903 to S904 are steps executed by the management device 500.

In S901, the input unit 304 receives from the data registrant a deletion data name concerning the storage encrypted data set to be deleted. As described above, the deletion data name may be any name as long as it allows the storage encrypted data set to be identified.

In S902, the transmission unit 309 transmits the deletion data name input in S901 to the management device 500.

In S903, the receiving unit 501 receives the deletion data name transmitted from the registration device 300 in S902.

In S904, the data storage unit 503 deletes the stored storage encrypted data set, based on the deletion data name received in S903.

S904s completes the deletion process of the searchable encryption system 100.

<Specific Example of Operation of This Embodiment>

A specific example of the operation of this embodiment will be indicated below.

The operation of this embodiment will be described with:
parameter L=3,
storage data D1=ABC, ID(D1)=1,
D2=BC, ID (D2)=2, and
search data s=BC.

The encryption function E will be described using the hash function.

First, the registration process of D1 and D2 will be described.

In S702, partitioning is performed as D1=(A, B, C) and D2=(B, C).

In S703,
A1={{(A), (AB), (ABC)}, {(B), (BC)}, {(C)}} and
A2={{(B), (BC)}, {(C)}}
are generated.

In S704,
B1={{(1, A), (1, AB), (1, ABC)}, {(2, B), (2, BC)}, {(3, C)}} and
B2={{(1, B), (1, BC)}, {(2, C)}}
are generated.

In S705,
C11=E(E(K, A), 1, 1),
C12=E(E(K, AB), 1, 1),
C13=E(E(K, ABC), 1, 1),
C14=E(E(K, B), 2, 1),
C15=E(E(K, BC), 2, 1),
C16=E(E(K, C), 3, 1) and
C21=E(E(K, B), 1, 2),
C22=E(E(K, BC), 1, 2),
C23=E(E(K, C), 2, 2)
are generated, and a storage encrypted data set (1, C(D1)) and a storage encrypted data set (2, C(D2)) are generated as the storage encrypted data set (ID(D), C(D)).

Note that
C(D1)={C11, C12, C13, C14, C15, C16}, and
C(D2)={C21, C22, C23}.

Take note of C=E(E(K, s), p, ID(D)) here.

By S707 and S708, the storage encrypted data sets (1, C(D1)) and (2, C(D2)) described above are stored in the management device 500.

Next, the search process in a case where the search data s is s=BC will be described.

In S802, encrypted data t=E(K, s) is calculated.

In S805, (1, C(D1)) and (2, C(D2)) are read out.

In S806,
T11=E(t, 1, 1),
T12=E(t, 2, 1),
T13=E(t, 3, 1) and
T21=E(t, 1, 2),
T22=E(t, 2, 2),
T23=E(t, 3, 2)
are calculated.

In S807, it is checked whether T11, T12, and T13 are included in C(D1), and whether T21, T22, and T23 are included in C(D2).

Actually, T12 is included in C(D1) (matches C15), and T21 is included in C(D2) (matches C22).

Thus, a search result R which is a set having (ID(D), p) as an element is generated as the search result R={(1, 2), (2, 1)}.

Take note here that the element of the search result R is (ID(D), p).

In S810, based on the search result R, search results that "the search data BC appears at the "second" position in the data of the storage data name "1"" and that "the search data BC appears at the "first" position in the data of the storage data name "2"" are output.

The specific example has been described above.

Figure 10:
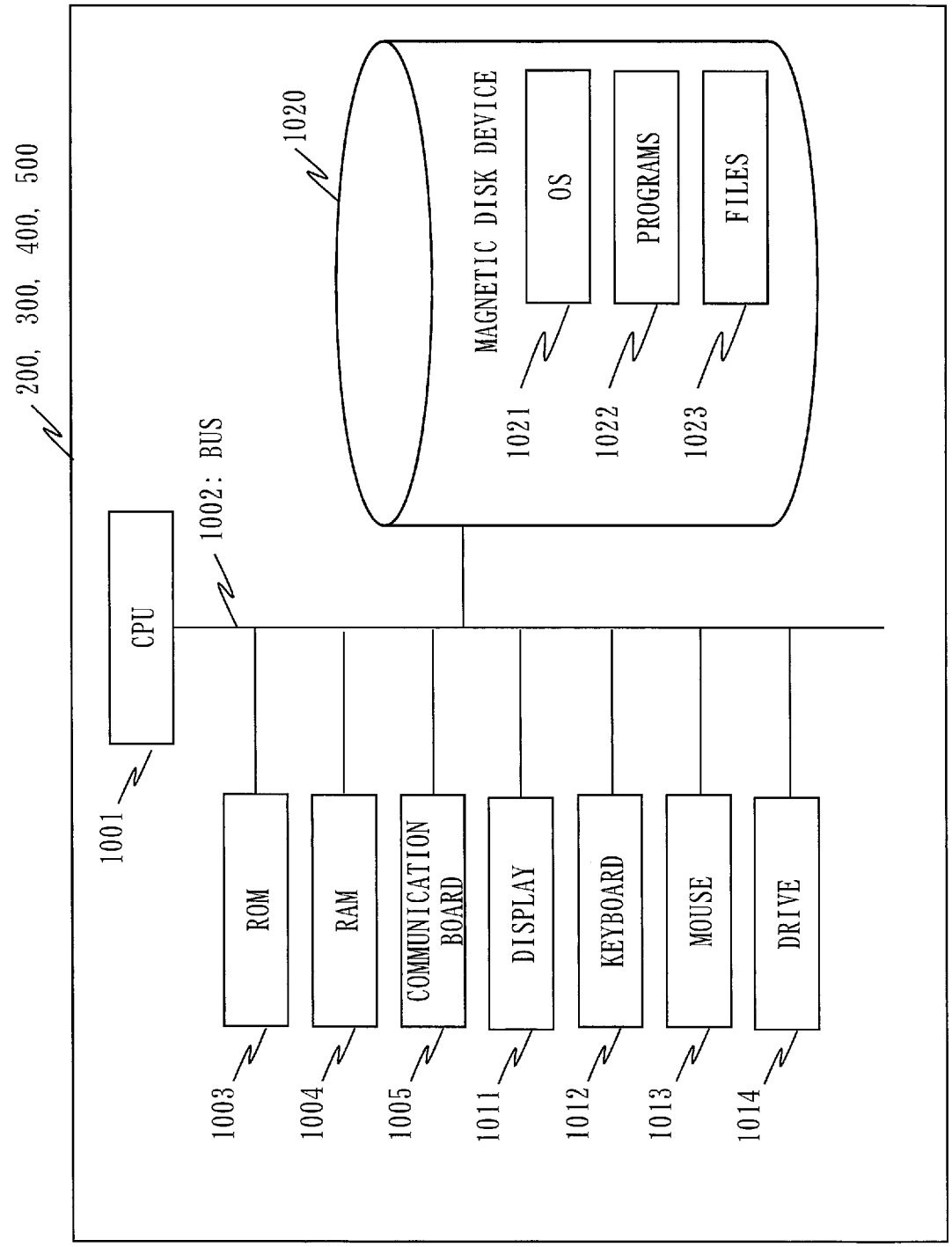
FIG. 10 is a diagram of the first embodiment and is a diagram illustrating an example of hardware resources of the searchable encryption system.

FIG. 10 is a diagram illustrating an example of hardware resources of each of the key generation device 200, the registration device 300, the search device 400, and the management device 500 in the first embodiment.

With reference to FIG. 10, each of the key generation device 200, the registration device 300, the search device 400, and the management device 500 includes a central processing unit (CPU) 1001.

The CPU 1001 is connected with hardware devices such as a ROM 1003, a RAM 1004, a communication board 1005, a display 1011 (display device), a keyboard 1012, a mouse 1013, a drive 1014, and a magnetic disk device 1020 via a bus 1002, and controls these hardware devices.

The drive 1014 is a device to read from and write to a storage medium such as a flexible disk drive (FD), a compact disc (CD), and a digital versatile disc (DVD).

The ROM 1003, the RAM 1004, the magnetic disk device 1020, and the drive 1014 are examples of a storage device. The keyboard 1012, the mouse 1013, and the communication board 1005 are examples of an input device. The display 1011 and the communication board 1005 are examples of an output device.

The communication board 1005 is connected to a communication network such as a local area network (LAN), the Internet, and a telephone line via a wire or wirelessly.

An operating system (OS) 1021, programs 1022, and files 1023 are stored in the magnetic disk device 1020. The programs 1022 include programs for executing functions each described as a " . . . unit" in this embodiment. The programs (for example, an encryption program, a data search program, and a data registration program) are read out and executed by the CPU 1001. That is, the programs cause a computer to function as the " . . . unit" or cause the computer to execute a procedure or a method of the " . . . unit". The files 1023 include various types of data (input, output, a determination result, a calculation result, a processing result, etc.) used in the " . . . unit" described in this embodiment.

In this embodiment, arrows included in the configuration diagrams and the flowcharts mainly indicate input and output of data and signals. The processes of this embodiment described based on the flowcharts and the like are executed using hardware such as the CPU 1001, the storage device, the input device, and the output device. What is described as the " . . . unit" in this embodiment may be a " . . . circuit", a " . . . device", " . . . equipment", or "circuitry", and may also be a " . . . step", a " . . . procedure", or a " . . . process". That is, what is described as the " . . . unit" may be implemented by any of firmware, software, hardware, and a combination of these.

<*Effects of First Embodiment*>

This embodiment has the following effects, for example.
(1) In this embodiment, even if the same storage data is stored in the server, storage encrypted data which is always different each time is generated because of the position information and the data name which is different each time. For this reason, vulnerability to a frequency analysis attack is reduced, and searchable encryption with partial matching achieving high security can be realized.
(2) In this embodiment, the storage data is encrypted and then stored. Thus, even if the storage encrypted data is leaked from the management device 500, the content of the storage data cannot be known.
(3) In this embodiment, it is possible to process not only the search data but also the storage data while they remain encrypted, so that the content of the search data cannot be known from the search encrypted data.
(4) In this embodiment, only the data name and the position information appear in the search result obtained from the storage encrypted data and the search encrypted data. Thus, the content of the storage data and the search data cannot be known to an entity not having the key, such as the server.
(5) In this embodiment, in addition to the fact that a hit is found for the search, the position information as to the position at which the search data appears can be known from the search result. Thus, a flexible partial match search function is provided.
(6) In this embodiment, the search encrypted data is composed of a single ciphertext, so that the data size used in searching is very small, and only one interaction between the data searcher and the server occurs in searching. Thus, partial match searching by searchable encryption can be performed efficiently.
(7) In this embodiment, everything can be configured based on the common-key cryptographic technique, so that efficient searchable encryption with partial matching can be realized.

Second Embodiment

A searchable encryption system of this embodiment will now be described. In the first embodiment, search encrypted data (t=E(K, s)) used previously can be immediately applied to a newly added storage encrypted data set ((ID(D), C(D))).

In a technique to be disclosed in the second embodiment, search encrypted data used previously cannot be applied to a newly added storage encrypted data set. Thus, higher security can be achieved. In order to achieve the above, a method using multiple encryption such as a hash chain will be disclosed.

In the second embodiment, when an encryption function E is described as "E^M(K, w)", this represents that the encryption function E is calculated M times (in other words, M-fold multiple encryption is performed) with the initial values (K, M). As such multiple encryption, for example, the hash chain is widely known.

For example, it is assumed that E^M(K, w) is search encrypted data t for data stored at the M-th time.

When it is assumed here that search encrypted data t for data stored at the (M+1)-th time is $t_M = E^{\wedge}(M-1)(K, w)$, the search encrypted data E^M(K, w) for the data stored at the M-th time can be generated by re-encrypting the search encrypted data $t_M = E^{\wedge}(M-1)(K, w)$ of the (M+1)-th time.

On the other hand, it is generally difficult with the encryption function such as the hash function to calculate E^(M−1)(K, w) from E^M(K, w).

For this reason, search encrypted data used previously cannot be applied to a newly added storage encrypted data set, and higher security can be achieved.

A searchable encryption system 100 of this embodiment is partially different from that of the first embodiment.

The key generation device 200 is changed to a key generation device 200a, the registration device 300 is changed to a registration device 300a, the search device 400 is changed to a search device 400a, and the management device 500 is changed to a management device 500a.

Configurations of this embodiment will be described below. A configuration of the key generation device 200a, a configuration of the registration device 300a, a configuration of the search device 400a, and a configuration of the management device 500a will be sequentially described below.

Figure 11:
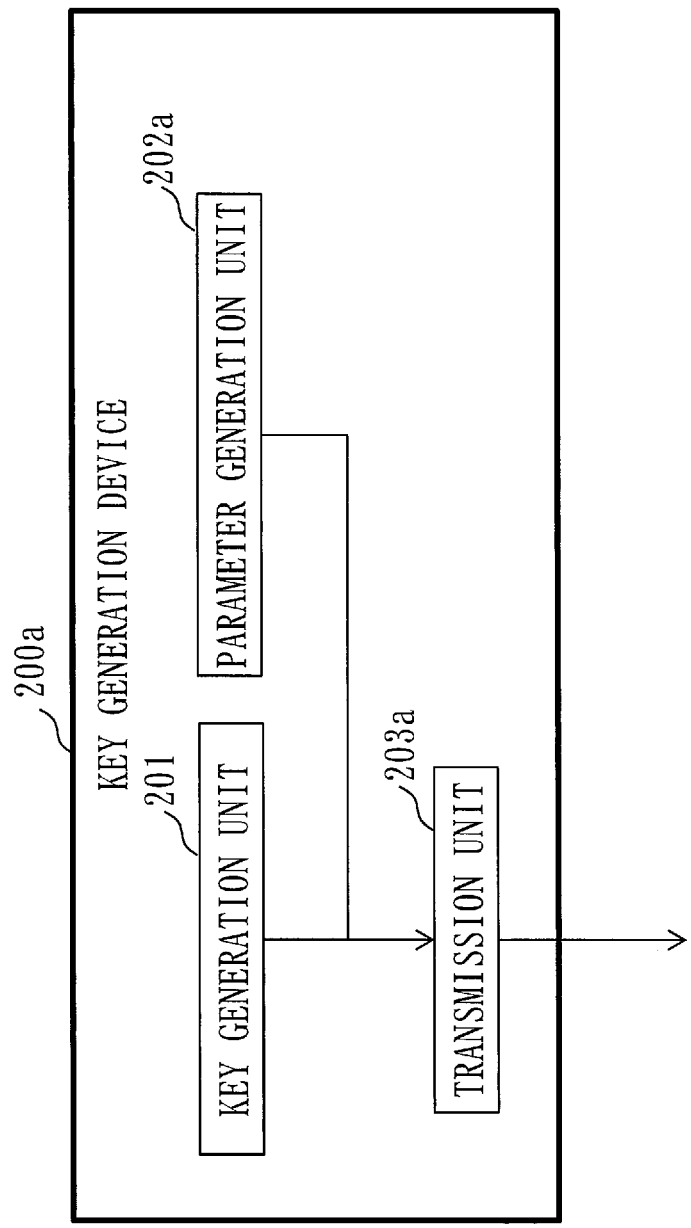
FIG. 11 is a diagram of a second embodiment and is a block diagram illustrating a configuration of a key generation device.

FIG. 11 is a block diagram illustrating the configuration of the key generation device 200a. As illustrated in FIG. 11, the key generation device 200a includes a key generation unit 201, a parameter generation unit 202a, and a transmission unit 203a. Although not illustrated, the key generation device 200a includes a recording medium to store data used in each unit of the key generation device 200a. The key generation unit 201 has already been described, and thus will not be described.

The parameter generation unit 202a generates the parameter L described above, and at the same time generates a parameter M representing the maximum number of times of multiple encryption. This M represents the maximum number of storage encrypted data sets that can store storage data in the management device 500a with the same key K. If more than the M number of storage encrypted data sets need to be stored, the M' number of sets can be newly registered by generating a new key K' and a new M'. Note that M is an integer greater than 1. Also note that M, like L, is not secret information, so that it may be disclosed publicly.

The transmission unit 203a transmits the key K generated in the key generation unit 201 to the registration device 300a and the search device 400a, and transmits the parameters (L, M) generated in the parameter generation unit 202a to the registration device 300a, the search device 400a, and the management device 500a.

Figure 12:
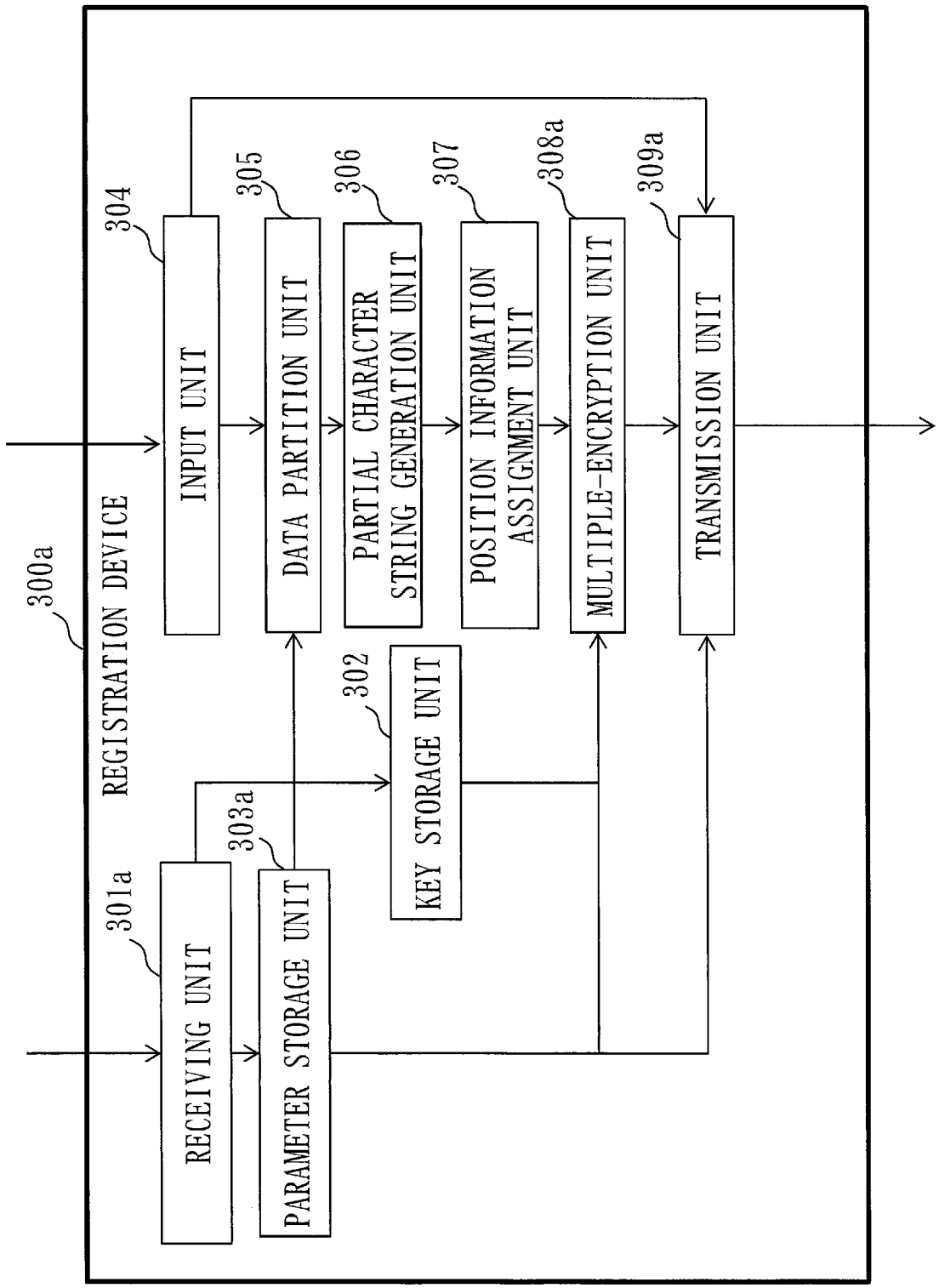
FIG. 12 is a diagram of the second embodiment and is a block diagram illustrating a configuration of a registration device.

FIG. 12 is a block diagram illustrating the configuration of the registration device 300a. As illustrated in FIG. 12, the registration device 300a includes a receiving unit 301a, a key storage unit 302, a parameter storage unit 303a, an input unit 304, a data partition unit 305, a partial character string generation unit 306, a position information assignment unit 307, a multiple-encryption unit 308a, and a transmission unit 309a. Although not illustrated, the registration device 300a includes a recording medium to store data used in each unit of the registration device 300a. The key storage unit 302, the input unit 304, the data partition unit 305, the partial character string generation unit 306, and the position information assignment unit 307 have already been described, and thus will not be described.

The receiving unit 301a receives the key K and the parameters (L, M) transmitted from the key generation device 200a.

The parameter storage unit 303a stores the parameters (L, M) received from the receiving unit 301a and stores a parameter m representing the number of storage encrypted data sets stored in the management device 500a which have been encrypted using the key K and the parameter M.

The multiple-encryption unit 308a reads out the key K from the key storage unit 302 and the parameter m from the parameter storage unit 303a, and generates a ciphertext C for each partial character string with position information in the partial character string set B with position information received from the position information assignment unit 307, as indicated below.

For each pair (p, w) of position information and a partial character string, $C = E(E\hat{\;}(M+1-m)(K, w), p, ID(D))$ is generated.

A set of ciphertexts obtained by encrypting all (p, w) will be denoted as C(D). (ID(D), m, C(D)) will hereinafter be referred to as a storage encrypted data set.

When $E\hat{\;}i$ (i≥1) is calculated, if E is the encryption function such as AES, a key is required each time E is calculated. Thus, the key may be predetermined such that all values are 0, 1, or the like, for example, and stored as a parameter, or the parameter L, M, or the like already stored may be used as the key. If E is the hash function, such a key is not required for multiple encryption.

The transmission unit 309a transmits the storage encrypted data set (ID(D), m, C(D)) received from the encryption unit 308 to the management device 500a, and transmits the parameter m to the search device 400a. The transmission unit 309a transmits the deletion data name received from the input unit 304 to the management device 500.

Figure 13:
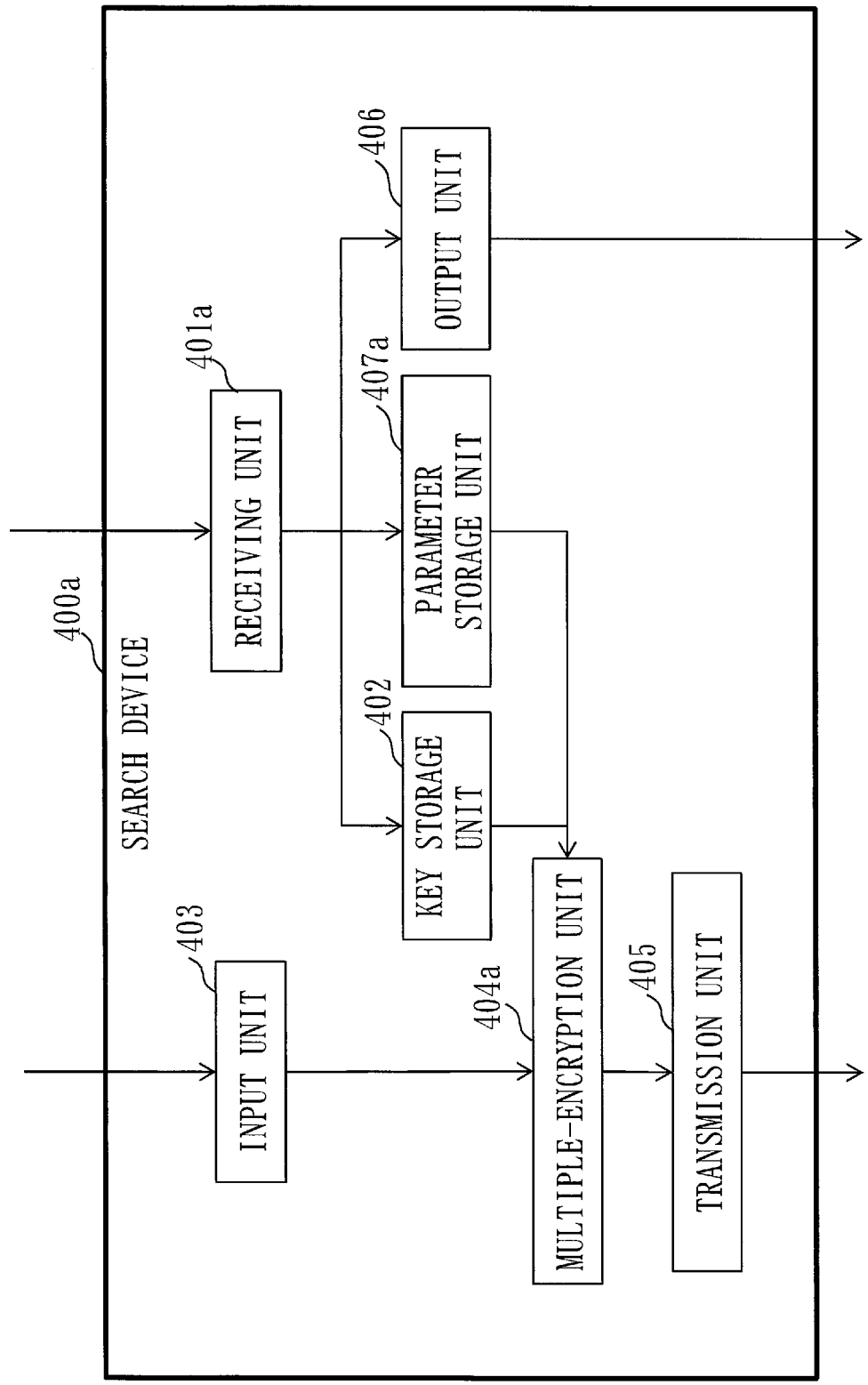
FIG. 13 is a diagram of the second embodiment and is a block diagram illustrating a configuration of a search device.

FIG. 13 is a block diagram illustrating the configuration of the search device 400a. As illustrated in FIG. 13, the search device 400a includes a receiving unit 401a, a key storage unit 402, an input unit 403, a multiple-encryption unit 404a, a transmission unit 405, an output unit 406, and a parameter storage unit 407a. Although not illustrated, the search device 400a includes a recording medium to store data used in each unit of the search device 400a.

The key storage unit 402, the input unit 403, the transmission unit 405, and the output unit 406 have already been described, and thus will not be described.

The receiving unit 401a receives the key K and the parameter M transmitted from the key generation device 200a, the parameter m transmitted from the registration device 300a, and a search result transmitted from the management device 500a.

The multiple-encryption unit 404a reads out the key K from the key storage unit 402 and the parameter m from the parameter storage unit 407a, and generates a ciphertext t for the search data s received from the input unit 403, as indicated below, using the key K and the parameter m.

The multiple-encryption unit 404a generates $t = E\hat{\;}(M+1-m)(K, s)$.

This t will hereinafter be referred to as search encrypted data.

As described above, when $E\hat{\;}i$ (i≥1) is calculated, if E is the encryption function such as AES, a key is required each time E is calculated. Thus, the key may be predetermined such that all values are 0, 1, or the like, for example, and stored as a parameter, or the parameter L, M, or the like already stored may be used as the key. If E is the hash function, such a key is not required for multiple encryption.

The parameter storage unit 407a stores the parameter M received from the receiving unit 401. When the parameter received from the receiving unit 401 is a pair including m, the parameter storage unit 407a updates the parameter m of (M, m) already stored.

Figure 14:
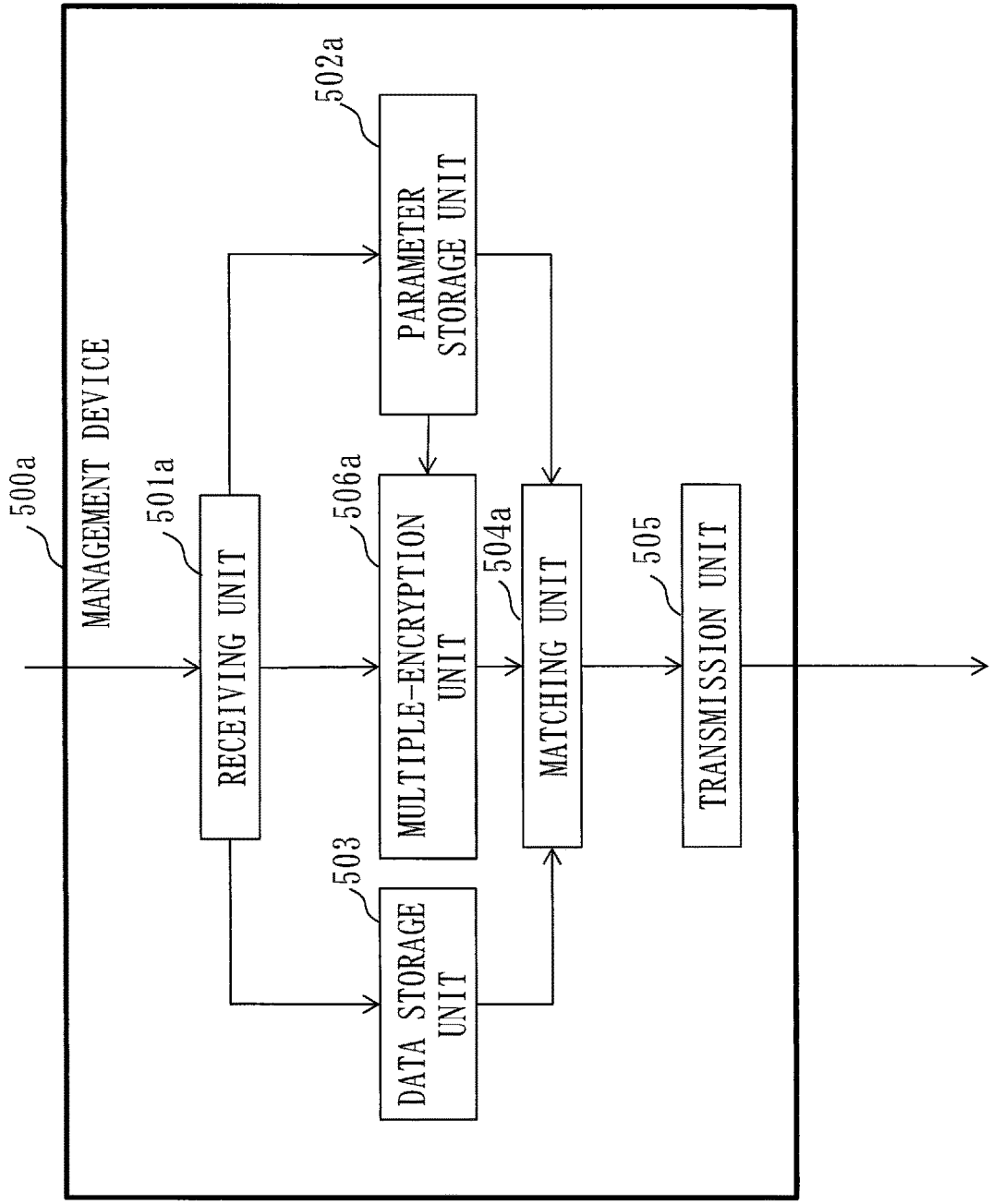
FIG. 14 is a diagram of the second embodiment and is a block diagram illustrating a configuration of a management device.

FIG. 14 is a block diagram illustrating the configuration of the management device 500a. As illustrated in FIG. 14, the management device 500a includes a receiving unit 501a, a parameter storage unit 502a, a data storage unit 503, a matching unit 504a, a transmission unit 505, and a multiple-encryption unit 506a. Although not illustrated, the management device 500a includes a recording medium to store data used in each unit of the management device 500a.

The data storage unit 503 and the transmission unit 505 have already been described, and thus will not be described.

The receiving unit 501a receives the parameters (L, M) transmitted from the key generation device 200a, the storage encrypted data set (ID(D), m, C(D)) and the deletion data name transmitted from the registration device 300a, and the search encrypted data t and the storage data name transmitted from the search device 400a.

The parameter storage unit 502a stores the parameters (L, M) and also m of the storage encrypted data set (ID(D), m, C(D)) which are received from the receiving unit 501a.

The matching unit 504a generates an empty set R concerning a search result, reads out all the storage encrypted data sets (ID(Di), m, C(Di)) (1≤i≤m) from the data storage unit 503, and performs matching and generates a search result, as described below, based on a multiple-encrypted data set {(1, t1), (2, t2), . . . , (m, tm)} received from the multiple-encryption unit 506a to be described later.

The matching unit 504a extracts a storage encrypted data set (ID(Di), i, C(Di)) for each i (1≤i≤m), and calculates $Xi = \{T1\_i = E(ti, 1, ID(Di)), \ldots, TL\_i = E(Ti, L, ID(Di))\}$.

Then, the matching unit 504a checks whether each Tp_i (1≤p≤L) is included in C(Di). If Tp_i is included in C(Di), the pair (ID(Di), p) is added to R. This (ID(Di), p) signifies that "the search data appears at the p-th position in ID(Di)".

Each Tp_i will hereinafter be referred to as matching data for ID(Di), and {T1, . . . , TL} will be referred to as a matching data set for ID(Di). A set R that is finally generated as a result of this process will be referred to as a search result.

If the receiving unit 501a has also received a storage data name from the search device 400a, the matching unit 504a reads out only the target storage encrypted data set from the data storage unit 503 based on that storage data name, and performs substantially the same process.

The multiple-encryption unit 506a reads out the parameter m from the parameter storage unit 502a, and generates multiple-encrypted data as indicated below, based on the search encrypted data t received from the receiving unit 501.

$$t1 = E^\wedge(m-1)(t),$$
$$t2 = E^\wedge(m-2)(t),$$
$$\cdots,$$
$$tm = E^\wedge 0(t) = t$$

A set {(1, t1), (2, t2), . . . , (m, tm)} will hereinafter be referred to as a multiple-encrypted data set.

As described above, when E^i (i≥1) is calculated, if E is the encryption function such as AES, a key is required each time E is calculated. Thus, the key may be predetermined such that all values are 0, 1, or the like, for example, and stored as a parameter, or the parameter L, M, or the like already stored may be used as the key. If E is the hash function, such a key is not required for multiple encryption.

The operation of the searchable encryption system 100 which is equivalent to a search method according to this embodiment will be described below.

Figure 15:
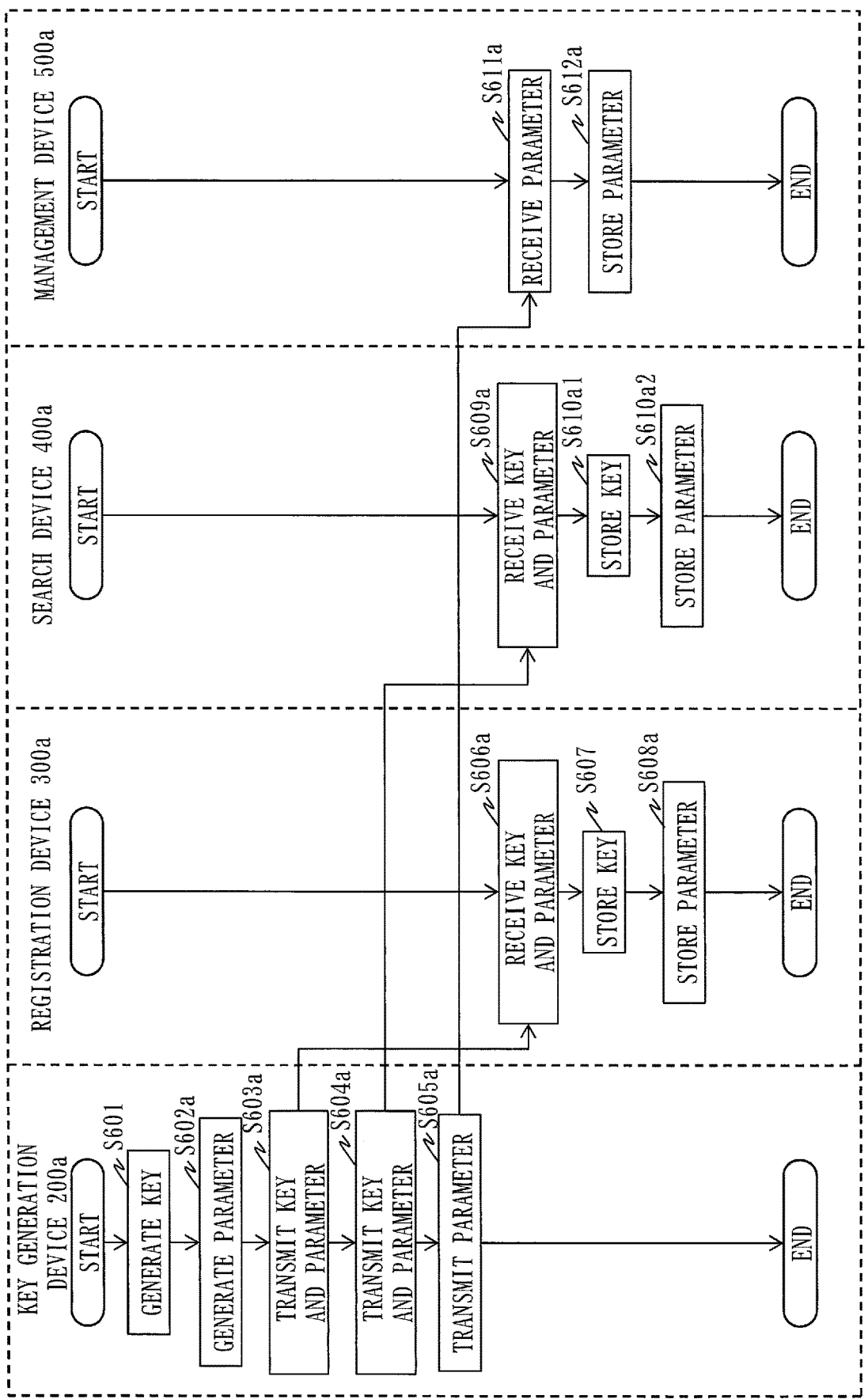
FIG. 15 is a diagram of the second embodiment and is a flowchart illustrating a key generation and storage process of a searchable search system.

FIG. 15 is a flowchart illustrating a key generation and storage process of the searchable encryption system 100 in this embodiment. S601 to S612a of FIG. 15 are steps executed by the key generation device 200a, the registration device 300a, the search device 400a, and the management device 500a. S601 to S605a are steps executed by the key generation device 200a. S606a to S608a are steps executed by the registration device 300a. S609a to S610a2 are steps executed by the search device 400a. S611a to S612a are steps executed by the management device 500a.

S601 and S607 in this search process are steps substantially the same as those of the first embodiment, and thus will not be described.

In S602a, the parameter generation unit 202a generates parameters L and M. As described above, L is the maximum number of character strings that appear when storage data is partitioned, and M represents the maximum number of storage encrypted data sets that can store storage data in the management device 500a by using the same key K.

In S603a, the transmission unit 203a transmits the key K generated in S601 and the parameters (L, M) generated in S602a to the registration device 300a.

In S604a, the transmission unit 203a transmits the key K generated in S601 and the parameters (L, M) generated in S602a to the search device 400a.

In S605a, the transmission unit 203a transmits the parameters (L, M) generated in S602 to the management device 500a.

In S606a, the receiving unit 301a receives the key K and the parameters (L, M) transmitted in S603a.

In S608a, the parameter storage unit 303a stores the parameters (L, M) received in S606a in a storage medium.

In S609a, the receiving unit 401a receives the key K and the parameters (L, M) transmitted in S604a.

In S610a1, the key storage unit 402 stores the key K received in S609a in the storage medium.

In S610a2, the parameter storage unit 407a stores the parameters (L, M) received in S609a in the storage medium.

In S611a, the receiving unit 501a receives the parameters (L, M) transmitted in S605a.

In S612a, the parameter storage unit 502a stores the parameters (L, M) received in S611a in the storage medium. S612a completes the key generation and storage process of the searchable encryption system 100.

Figure 16:
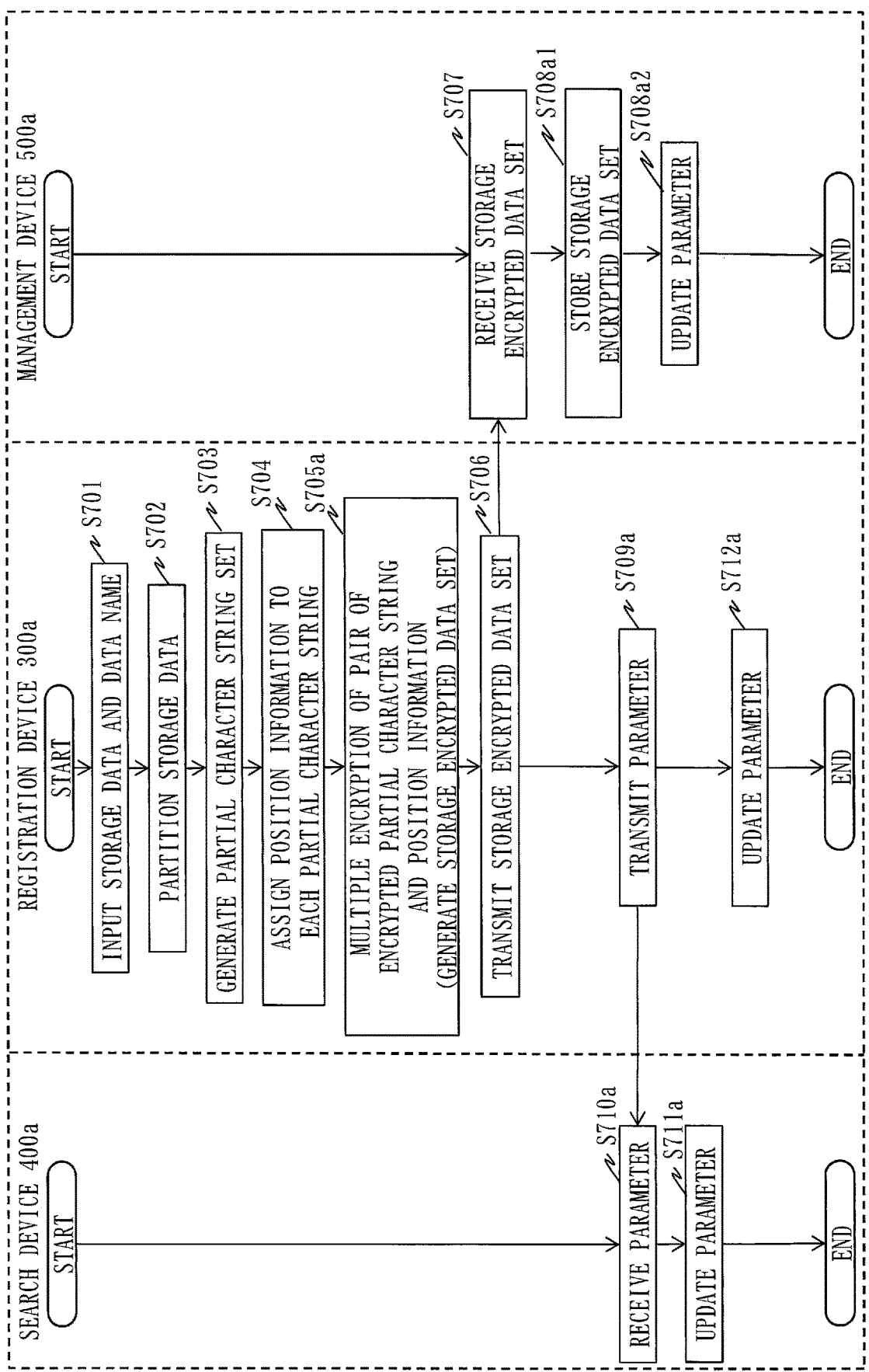
FIG. 16 is a diagram of the second embodiment and is a flowchart illustrating a data registration process of the searchable search system.

FIG. 16 is a flowchart illustrating a registration process of the searchable encryption system 100 of the second embodiment. S701 to S712a of FIG. 16 are steps executed by the registration device 300a, the search device 400a, and the management device 500a. S701 to S706, S709a, and S712a are steps executed by the registration device 300a. S707 to S708a2 are steps executed by the management device 500a. S710a to S711a are steps executed by the search device 400a.

S701 to S704 and S706 to S707 in this search process are steps substantially the same as those of the first embodiment, and thus will not be described.

In S705a, the multiple-encryption unit 308a reads out the key K from the key storage unit 302 and the parameter m from the parameter storage unit 303a, and generates a ciphertext C of each partial character string with position information in the partial character string set B with position information generated in S704, as indicated below.

For each pair (p, w) of position information and a partial character string, the multiple-encryption unit 308a calculates
C=E(E^(M+1−m)(K, w), p, ID(D)). A set of ciphertexts obtained by encrypting all (p, w) is denoted as C(D), and a storage encrypted data set (ID(D), m, C(D)) is generated.

In S708a1, the data storage unit 503 stores the storage encrypted data set (ID(D), m, C(D)) received in S707.

In S708a2, the parameter storage unit 502a updates the value of the stored m based on m in the storage encrypted data set (ID(D), m, C(D)) received in S707.

In S709a, the transmission unit 309a transmits the parameter m read out in S705a to the search device 400a.

In S710a, the receiving unit 401a receives the parameter m transmitted in S710a.

In S711a, the parameter storage unit 407a updates the stored parameter m by replacing it with the parameter m received in S711a.

In S712a, the parameter storage unit 303a increments the value of the parameter m by one to update the value of m. S712a completes the registration process of the searchable encryption system 100.

Figure 17:
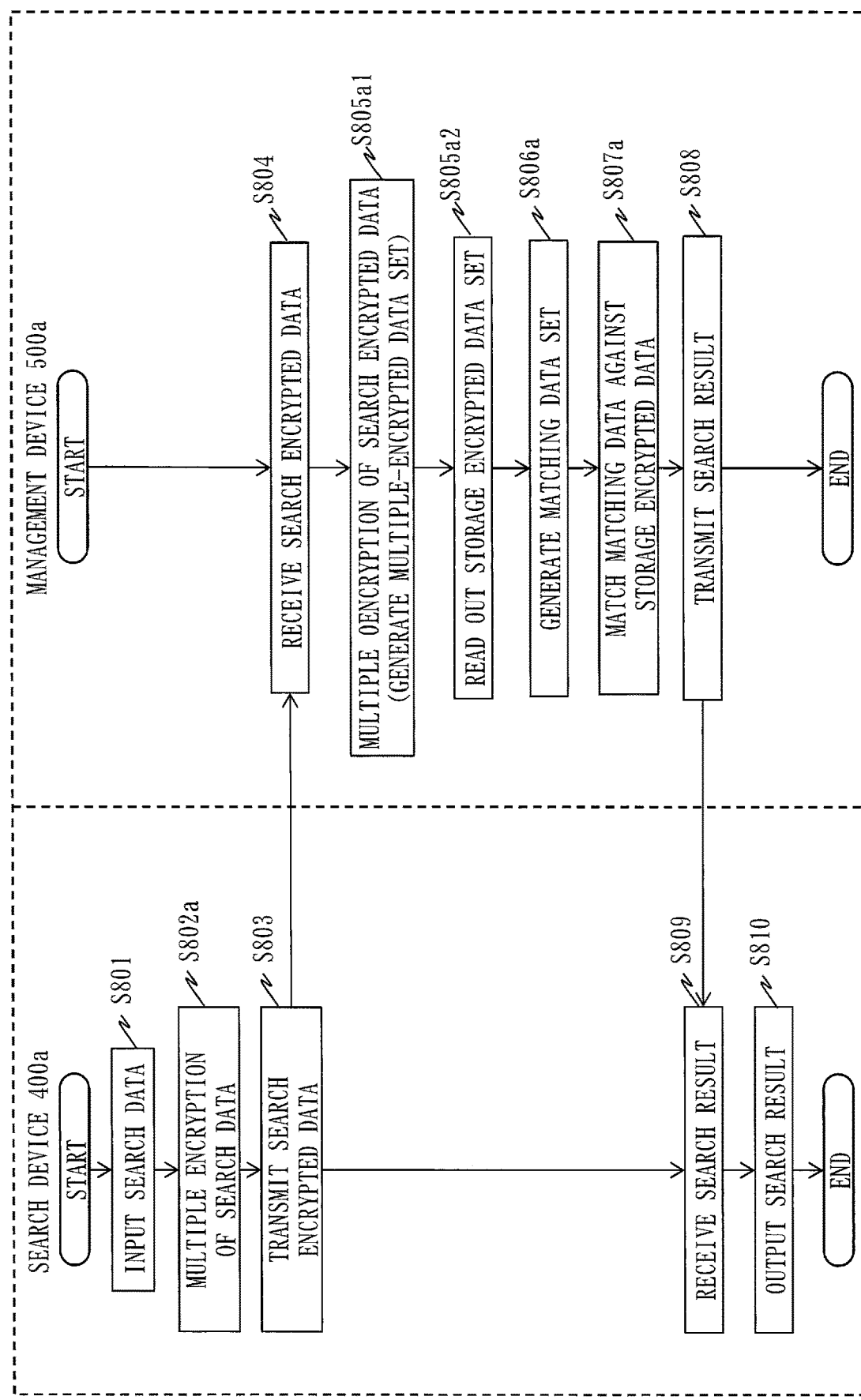
FIG. 17 is a diagram of the second embodiment and is a flowchart illustrating a data search process of the searchable search system.

FIG. 17 is a flowchart illustrating a search process of the searchable encryption system 100 of the second embodiment. S801 to S810 of FIG. 17 are steps executed by the search device 400a and the management device 500a. S801 to S803 and S809 to S810 are steps executed by the search device 400a. S804 to S808 are steps executed by the management device 500a.

S801, S803, S804, and S808 to S810 in this search process are steps substantially the same as those of the first embodiment, and thus will not be described.

In S802a, the multiple-encryption unit 404a reads out the key K from the key storage unit 402 and the parameter m from the parameter storage unit 407a, and generates search encrypted data t for the search data s received in S801, as indicated below, using the key K.

t=E^(M+1−m)(K, s)

In S805a1, the multiple-encryption unit 506a reads out the parameter m from the parameter storage unit 502a, and generates a multiple-encrypted data set as indicated below, based on the search encrypted data t received in S804.

{(1, t1), (2, t2), . . . , (m, tm)}

Note that t1=E^(m−1)(t) and t2=E^(m−2)(t), . . . , tm=E^0 (t)=t.

In S805a2, the matching unit 504a reads out the storage encrypted data set (ID(D), C(D)) from the data storage unit 503. If a storage data name has also been received in S804, only the target storage encrypted data set is read out based on that storage data name. If no storage data name has been received in S804, all the stored storage encrypted data sets are read out. The storage encrypted data sets that are read out here are denoted as {(ID(D1), 1, C(D1)), . . . , (ID(Dm), m, C(Dm))}.

In S806a, the matching unit 504a reads out the parameter L from the parameter storage unit 502a, and with regard to each (ID(Di), i, C(Di)) (1≤i≤m) read out in S805a2, generates a matching data set Xi={T1_i, . . . , TL_i} for ID(Di), based on the multiple-encrypted data (i, ti) generated in S805a1.

Note that T1_i=E(ti, 1, ID(Di)), . . . , TL_i=E(ti, L, ID(Di)).

In S807a, the matching unit 504a generates an empty set R concerning a search result, and performs the following process for each p (1≤p≤L).

It is checked whether each piece of matching data Tp_i (1≤p≤L) for ID(Di) generated in S806a is included in C(Di). If Tp_i is included in C(Di), the pair (ID(Di), p) is added to R.

S810 completes the search process of the searchable encryption system 100. Also in this embodiment, the storage encrypted data set can be deleted by performing substantially the same deletion process as that in the first embodiment.

<Specific Example of Operation of This Embodiment>
The operation of this embodiment will be described with:
parameter L=3, parameter M=2,
first storage data D1=ABC, ID(D1)=1,
next storage data D2=BC, ID(D2)=2, and
search data=BC.

The encryption function E will be described using the hash function.

First, the registration process of D1 will be described.
In S702, partitioning is performed as D1=(A, B, C).
In S703,
A1={{(A), (AB), (ABC)}, {(B), (BC)}, {(C)}}
is generated.
In S704,
B1={{(1, A), (1, AB), (1, ABC)}, {(2, B), (2, BC)}, {(3, C)}}
is generated.
In S705a, m=1 is read out, and then
C11=E(E^2(K, A), 1, 1),
C12=E(E^2(K, AB), 1, 1),
C13=E(E^2(K, ABC), 1, 1),
C14=E(E^2(K, B), 2, 1),
C15=E(E^2(K, BC), 2, 1), and
C16=E(E^2(K, C), 3, 1)
are generated to generate a storage encrypted data set (1, C(D1)).
Note that C(D1)={C11, C12, C13, C14, C15, C16} and M+1−m=2.

By S707 and S708a1, the storage encrypted data set (1, 1, C(D1)) is stored. By S708a2 to S712a, the parameter m in the parameter storage unit 303a is updated to 2, and the parameter m in the parameter storage unit 407a and the parameter m in the parameter storage unit 502a are updated to 1.

Next, the search process using s against D1 will be described.
In S802a, m=1 is read out and t=E^2(K, s) is calculated.
Note that M+1−m=2.
In S805a1, m=1 is read out, t1=t is calculated, and a multiple-encrypted data set {(1, t1)} is generated.
In S805a2, (1, 1, C(D1)) is read out.
In S806a,
T1_1=E(t1, 1, 1),
T2_1=E(t1, 2, 1), and
T3_1=E(t1, 3, 1)
are calculated.
In S807a, it is checked whether T1_1, T2_1, and T3_1 are included in C(D1). Actually, T2_1 is included in C(D1) (matches C15).
Thus, a search result R={(1, 2)} is generated.
In S810, based on R, a search result that "the search data BC appears at the "second" position in the data of the storage data name "1"" is output.

Next, the registration process of D2 is performed.
In S702, partitioning is performed as D2=(B, C).
In S703, A2={{(B), (BC)}, {(C)}} is generated.
In S704, B2={{(1, B), (1, BC)}, {(2, C)}} is generated.
In S705a, m=2 is read out, and then
C21=E(E^1(K, B), 1, 2),
C22=E(E^1(K, BC), 1, 2), and
C23=E(E^1(K, C), 2, 2)
are generated to generate a storage encrypted data set (2, C(D2)).
Note that C(D2)={C21, C22, C23} and M+1−m=1.
Also note that E^1=E.

By S707 and S708a1, the storage encrypted data set (2, 2, C(D2)) is stored.
By S708a2 to S712a, the parameter m in the parameter storage unit 303a is updated to 3, and the parameter m in the parameter storage unit 407a and the parameter m in the parameter storage unit 502a are updated to 2.

Next, the search process using s again against D1 and D2 will be described.
In S802a, m=2 is read out and t=E(K, s) is calculated.
Note that M+1−m=1.
In S805a1, m=2 is read out, t1=E(t) and t2=t are calculated, and a multiple-encrypted data set {(1, t1), (2, t2)} is generated.
In S805a2, (1, 1, C(D1)) and (2, 2, C(D2)) are read out.
In S806a,
T1_1=E(t1, 1, 1),
T2_1=E(t1, 2, 1),
T3_1=E(t1, 3, 1) and
T1_2=E(t2, 1, 2),
T2_2=E(t2, 2, 2),
T3_2=E(t2, 3, 2)
are calculated.
In S807a, it is checked whether T1_1, T2_1, and T3_1 are included in C(D1), and whether T1_2, T2_2, and T3_2 are included in C(D2).
Actually, T2_1 is included in C(D1) (matches C15) and T1_2 is included in C(D2) (matches C22).
Thus, a search result R={(1, 2), (2, 1)} is generated.
In S810, based on R, search results that "the search data BC appears at the "second" position in the data of the storage data name "1" and that "the search data BC appears at the "first" position in the data of the storage data name "2"" are output.

The search data of the first search and the search data of the second search are identical (s=BC). However, since the search encrypted data is E^2(K, s) and E(K, s), respectively, the different values are generated. It is possible to calculate E^2(K, s) from E(K, s), so that it is possible to create the search encrypted data of the first search from the search encrypted data of the second search. On the other hand, it is generally difficult to calculate E(K, s) from E^2(K, s), so that it is difficult to create the search encrypted data of the second search from the search encrypted data of the first search.

The specific example has been described above.

An example of hardware resources in this embodiment is substantially the same as that in the first embodiment, and thus will not be described. This embodiment has the following effects, for example.

<*Effects of Second Embodiment*>

In this embodiment, substantially the same effects as those of the first embodiment are obtained. In addition, by using multiple encryption such as the hash chain, search encrypted data used previously cannot be applied to a newly added storage encrypted data set. Thus, higher security can be achieved.

Third Embodiment

A searchable encryption system according to this embodiment will now be described.

In the second embodiment, higher security can be achieved by using multiple encryption such as the hash chain. However, the number of storage encrypted data sets that can be generated and stored with the same key K depends linearly on the parameter M, requiring M to be large to some extent.

On the other hand, if M is too large, a multiple encryption process takes time.

Thus, this embodiment discloses a technique in which a plurality of pieces of storage data are stored together, instead of storing storage data piece by piece, thereby increasing the maximum number of pieces of storage data that can be encrypted and stored with the same K even if the same M is selected as in the second embodiment, and also enhancing search efficiency.

This embodiment discloses a method for storing a plurality of pieces of storage data as an index, instead of storing storage data piece by piece.

A searchable encryption system 100 of this embodiment is partially different from that of the second embodiment. The key generation device 200a is changed to a key generation device 200b, the registration device 300a is changed to a registration device 300b, the search device 400a is changed to a search device 400b, and the management device 500a is changed to a management device 500b.

Configurations of this embodiment will be described below. A configuration of the key generation device 200b, a configuration of the registration device 300b, a configuration of the search device 400b, and a configuration of the management device 500b will be sequentially described below.

Figure 18:
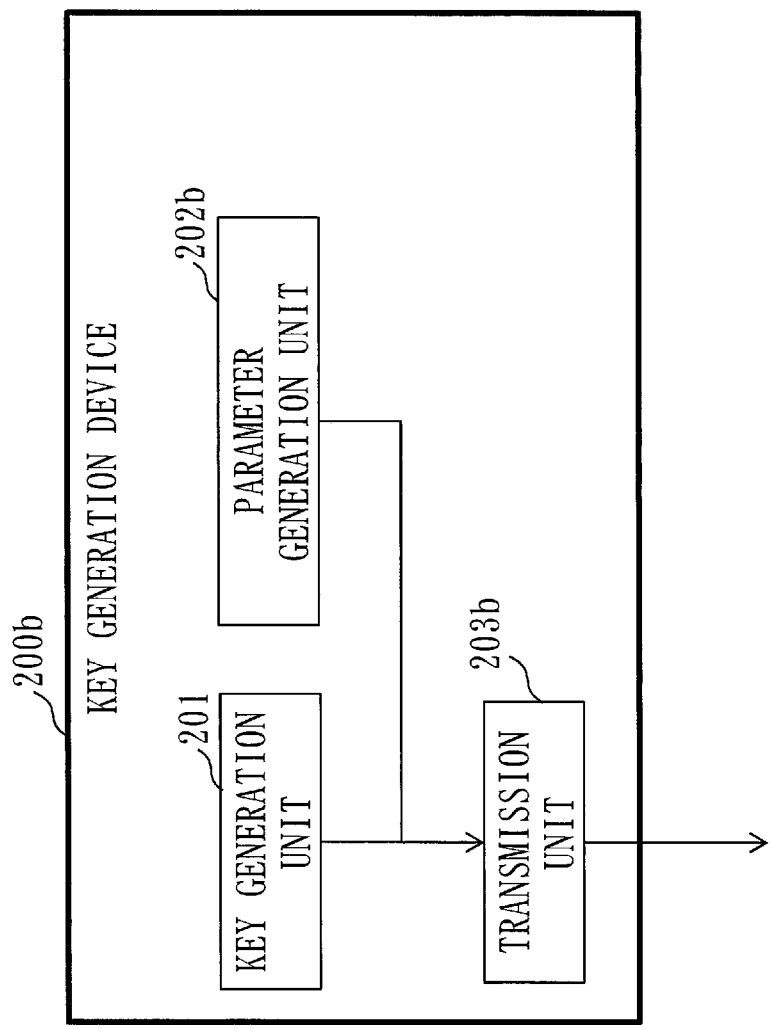
FIG. 18 is a diagram of a third embodiment and is a block diagram illustrating a configuration of a key generation device.

FIG. 18 is a block diagram illustrating the configuration of the key generation device 200b. As illustrated in FIG. 18, the key generation device 200b includes a key generation unit 201, a parameter generation unit 202b, and a transmission unit 203b. Although not illustrated, the key generation device 200b includes a recording medium to store data used in each unit of the key generation device 200b. The key generation unit 201 has already been described, and thus will not be described.

The parameter generation unit 202b generates the parameters L and M described above, and at the same time generates a parameter N representing the maximum number of pieces of storage data that can be stored at a time. That is, each index can hold information regarding up to N pieces of storage data. If the number of pieces of storage data to be stored at a time exceeds N, a plurality of indexes are generated such that each index is associated with up to N pieces of storage data. Note that N is an integer greater than 1. Alto note that N, like L and M, is not secret information, so that it may be disclosed publicly.

The transmission unit 203b transmits the key K generated by the key generation unit 201 to the registration device 300b and the search device 400b, transmits the parameters (L, M, N) generated by the parameter generation unit 202b to the registration device 300b and the management device 500b, and transmits the parameters (L, M) to the search device 400b.

Figure 19:
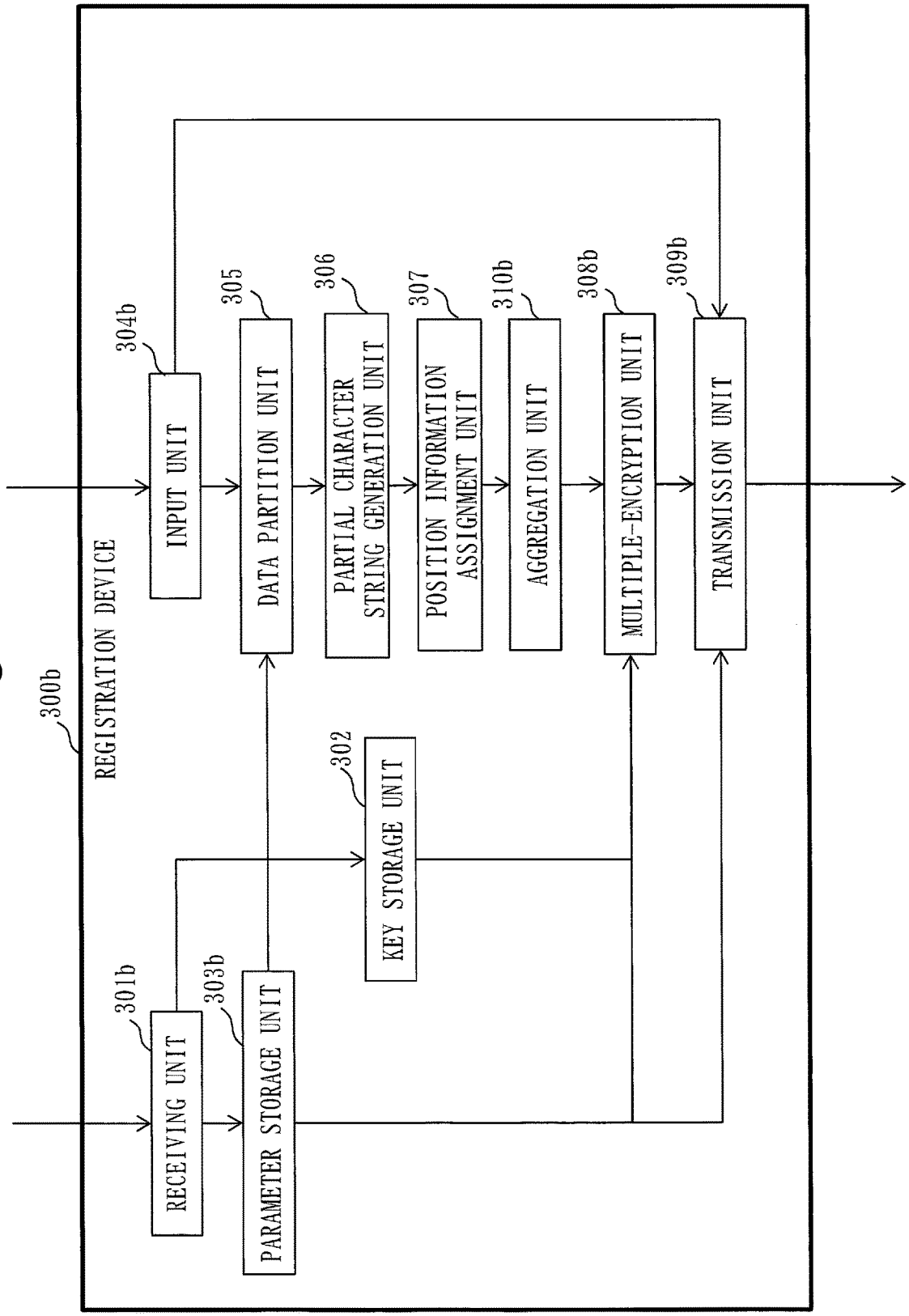
FIG. 19 is a diagram of the third embodiment and is a block diagram illustrating a configuration of a registration device.

FIG. 19 is a block diagram illustrating the configuration of the registration device 300b. As illustrated in FIG. 19, the registration device 300b includes a receiving unit 301b, a key storage unit 302, a parameter storage unit 303b, an input unit 304b, a data partition unit 305, a partial character string generation unit 306, a position information assignment unit 307, a multiple-encryption unit 308b, a transmission unit 309b, and an aggregation unit 310b. Although not illustrated, the registration device 300b includes a recording medium to store data used in each unit of the registration device 300b.

The key storage unit 302, the data partition unit 305, the partial character string generation unit 306, and the position information assignment unit 307 have already been described, and thus will not be described.

The receiving unit 301b receives the key K and the parameters (L, M, N) transmitted from the key generation device 200b.

The parameter storage unit 303b stores the parameters (L, M, N) received from the receiving unit 301b, and also stores a parameter m representing the number of indexes stored in the management device 500a which have been encrypted using the key K and the parameter M. The initial value of m indicates 1, and when m is read out from the multiple-encryption unit 308a, the value of m is incremented by one to update the value of m.

The input unit 304b receives a set of pairs of storage data and a storage data name {(ID(D1), D1), . . . , (ID(Dn), Dn)} and an index name ID(I) from a data registrant.

The pairs of storage data and a storage data name may be received one by one, instead of as the set.

If n>N, partitioning may be performed such that n=n1+ . . . +nk and nj≤n (1≤j≤n) and the following process may be performed k times for each nj.

If no index name is input by the data registrant, the input unit 304b may assign a random number to ID(I), or may assign an integer value greater than 0 sequentially such that it does not overlap with other index names.

It is assumed here that the data partition unit 305, the partial character string generation unit 306, and the position information assignment unit 307 perform the following process on {(ID(D1), D1), . . . , (ID(Dn), Dn)} above.

It is assumed that each data is partitioned as $D1 = (w_{1\_1}, \ldots, w_{L\_1}), \ldots, Dn = (w_{1\_n}, \ldots, w_{L\_n})$, and each partial character string set $B_i$ with position information (1≤i≤n) is generated as follows.

$$\{(1, w_{1\_i}), (1, w_{1\_i} w_{2\_i}), \ldots, (1, w_{1\_i} \ldots w_{L\_i})\},$$

$$\{(2, w_{2\_i}), (2, w_{2\_i} w_{3\_i}), \ldots, (1, w_{2\_i} \ldots w_{L\_i})\},$$

$$\ldots ,$$

$$\{(L, w_{L\_i})\}\}$$

The multiple-encryption unit 308b receives an aggregated data set Y received from the aggregation unit 310b to be described later, reads out the key K from the key storage unit 302 and the parameters (m, M, N) from the parameter storage unit 303b, and generates a ciphertext of each element of Y and a set I, as indicated below.

For each element (p, w, {ID(D_il), . . . , ID(Djk)}, {ID(D_ik+1), . . . , ID(D_in)}), $$C1 = E(E^{\wedge}(M + 1 - m)(K, w, 0), p, 1, ID(I)),$$

$$\ldots ,$$

$$Ck = E(E^{\wedge}(M + 1 - m)(K, w, 0), p, k, ID(I)),$$

-continued $$Ck + 1 = E(E^\wedge(M + 1 - m)(K, w, 1), p, k + 1, ID(I)),$$

$$\ldots,$$

$$Cn = E(E^\wedge(M + 1 - m)(K, w, 1), p, n, ID(I))$$

are generated, and the set I={(Cj, ID(D_ij))} is set. This set I will hereinafter be referred to as an index.

(ID(I), m, I) will be referred to as a storage index.

The transmission unit 309b transmits the storage index (ID(I), m, I) received from the multiple-encryption unit 308b to the management device 500b, and transmits the parameter m used in generating the index I to the search device 400b.

The aggregation unit 310b generates a set Y as indicated below for B1, . . . , Bn received from the position information assignment unit 307.

Each element of the set Y (p, w, {ID(D_i1), . . . , ID(D_ik)}, {ID(D_ik+1), . . . , ID(D_in)})

signifies that "(p, w) is included in each of Bi1, . . . , Bik, but not included in Bik+1, . . . , Bin".

It is assumed that this pair (p, w) is always included in one of B1, . . . , Bn. It may be included in more than one of B1, . . . , Bn. That is, Y can be regarded as a set in which the elements of B1, Bn are aggregated. Also note that {ID(D_i1), . . . , ID(D_in)}={ID(D1), . . . , ID(Dn)}. Y will hereinafter be referred to as an aggregated data set.

Figure 20:
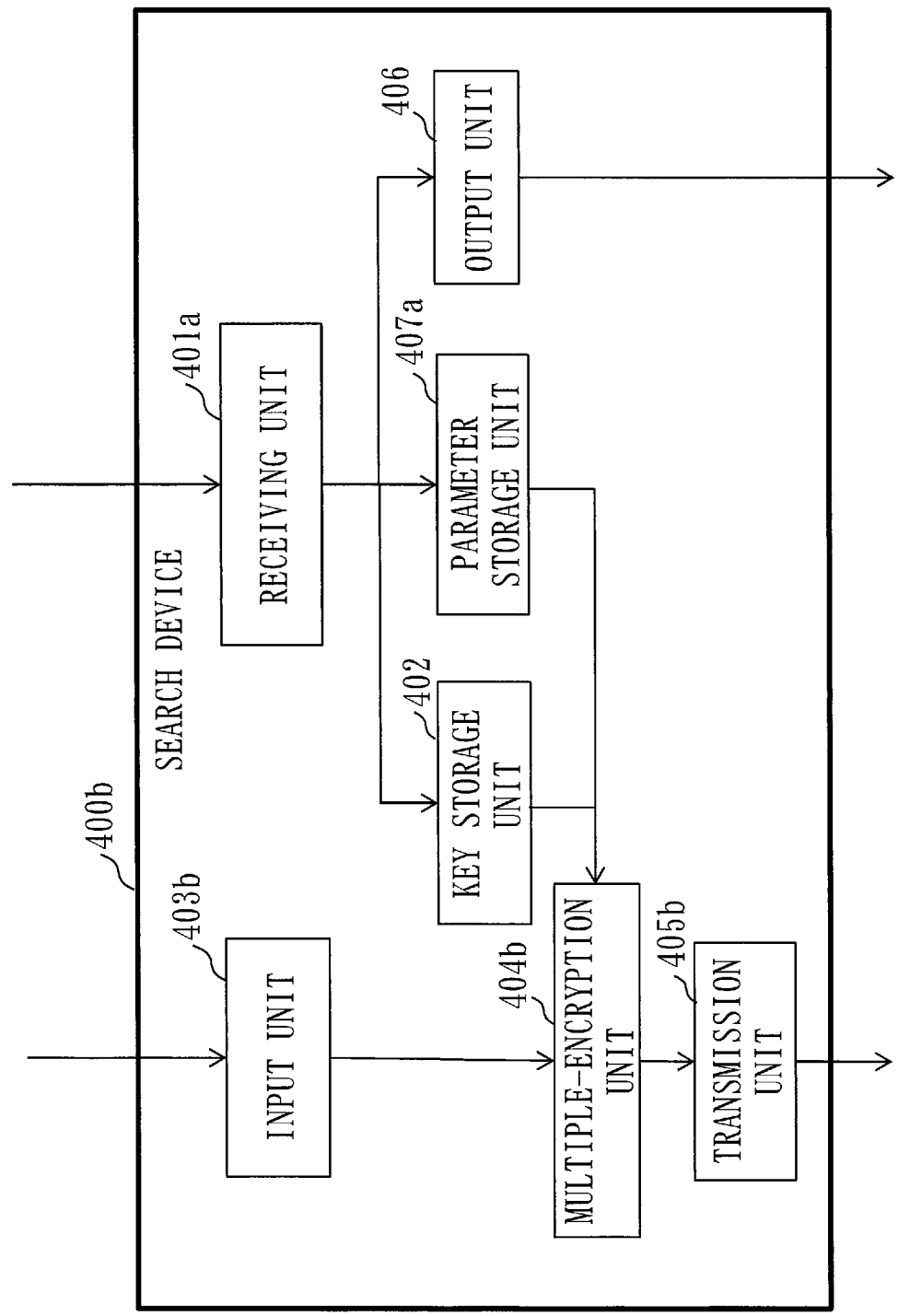
FIG. 20 is a diagram of the third embodiment and is a block diagram illustrating a configuration of a search device.

FIG. 20 is a block diagram illustrating the configuration of the search device 400b. As illustrated in FIG. 20, the search device 400b includes a receiving unit 401a, a key storage unit 402, an input unit 403b, a multiple-encryption unit 404b, a transmission unit 405b, an output unit 406, and a parameter storage unit 407a. Although not illustrated, the search device 400b includes a recording medium to store data used in each unit of the search device 400b.

The receiving unit 401a, the key storage unit 402, the output unit 406, and the parameter storage unit 407a have already been described, and thus will not be described.

The input unit 403b receives search data s input by a data searcher. Together with the search data, the input unit 403b may also receive a plurality of storage index names to identify the storage indexes to be searched with that search data.

The multiple-encryption unit 404b reads out the key K from the key storage unit 402 and the parameter m from the parameter storage unit 407a, and generates a ciphertext t for the search data s received from the input unit 403b, as indicated below, using the key K and the parameter m.

The multiple-encryption unit 404b generates t=E^(M+1−m)(K, s, 0).

This t will hereinafter be referred to as search encrypted data.

The transmission unit 405b transmits the search encrypted data t received from the multiple-encryption unit 404b to the management device 500b. If a storage index name has also been input by the data searcher together with the search data, both the search encrypted data and the storage index name are transmitted to the management device 500b.

Figure 21:
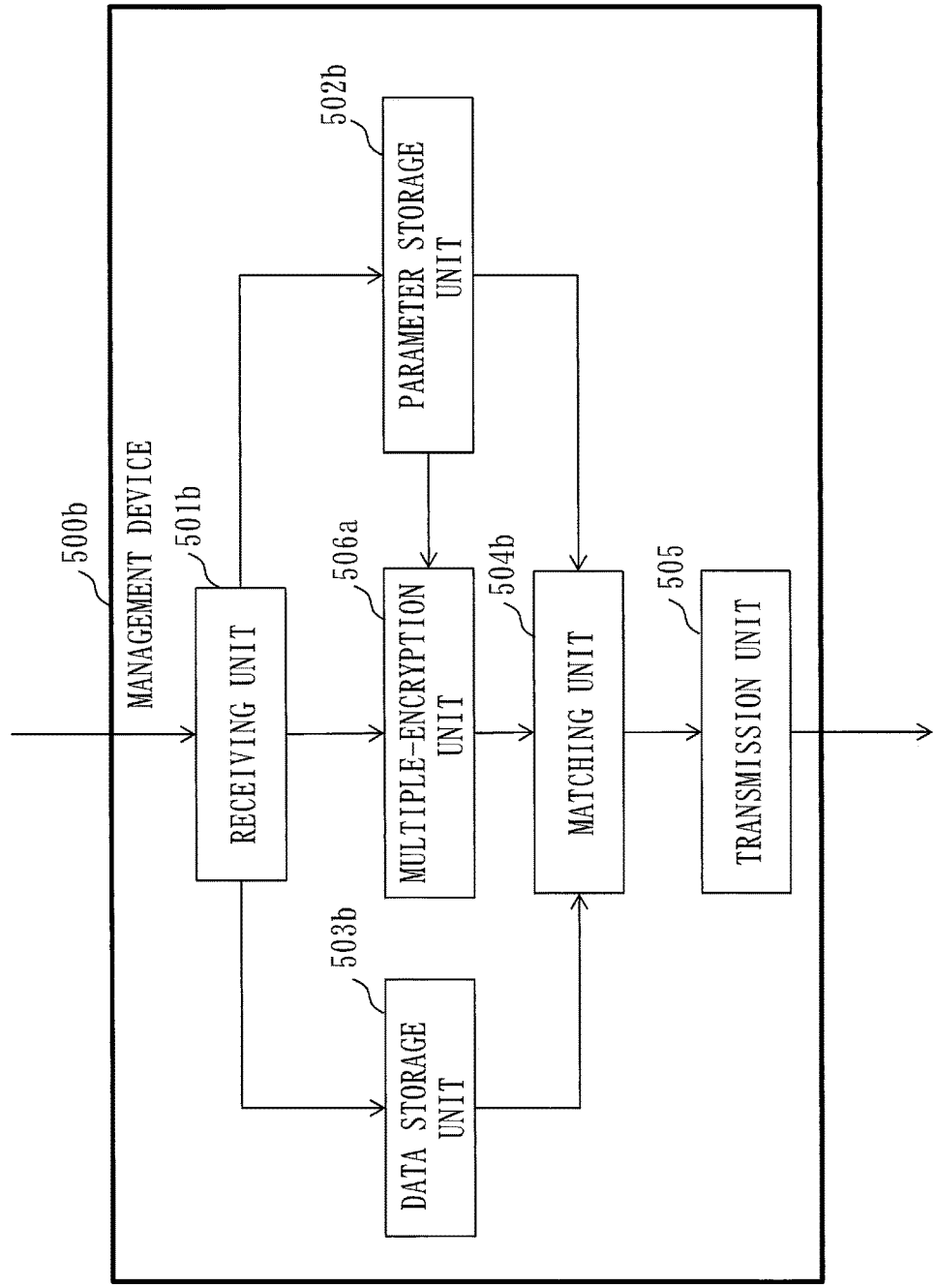
FIG. 21 is a diagram of the third embodiment and is a block diagram illustrating a configuration of a management device.

FIG. 21 is a block diagram illustrating the configuration of the management device 500b. As illustrated in FIG. 21, the management device 500b includes a receiving unit 501b, a parameter storage unit 502b, a data storage unit 503b, a matching unit 504b, a transmission unit 505, and a multiple-encryption unit 506a. Although not illustrated, the management device 500b includes a recording medium to store data used in each unit of the management device 500b.

The transmission unit 505 and the multiple-encryption unit 506a have already been described, and thus will not be described.

The receiving unit 501b receives the parameters (L, M, N) transmitted from the key generation device 200b, the storage encrypted data set (ID(I), m, I) and the deletion index name transmitted from the registration device 300b, and the search encrypted data and the storage index name transmitted from the search device 400b.

The parameter storage unit 502b stores the parameters (L, M, N) and also m of the storage index (ID(I), m, I) which are received from the receiving unit 501b.

The data storage unit 503b stores the storage index (ID(I), m, I) received from the receiving unit 501b. If necessary, a date and time of transmission may also be stored at the same time. The data storage unit 503b deletes the stored storage index, based on the deletion index name received from the receiving unit 501b.

The matching unit 504b generates an empty set R concerning a search result, reads out all the storage indexes (ID(I), m, I) from the data storage unit 503b, and performs matching and generates a search result, as described below, based on the multiple-encrypted data set {(1, t1), (2, t2), (m, tm)} received from the multiple-encryption unit 506a.

The matching unit 504b extracts a storage index (ID(I), i, I) for each i (1≤i≤m), and executes the following repeatedly.

The matching unit 504b calculates C_pj=E(ti, p, j, ID(I)) for each p (1≤p≤L) and each j (1≤j≤N) (a total of L×N calculations), and checks whether each C_pj is included in the index I. If C_pj is included, ID(D) that is stored by being paired with that C_pj is extracted and (ID(D), p) is added to the empty set R.

If C_pj is included in I, but C_pj+1=E(ti, p, j+1, ID(I)) is not included in the index I, then E(ti, p, j+2, ID(I)), . . . , E(ti, p, N, ID(I)) are also not included in the index I. Thus, these calculations can be omitted to enhance search efficiency.

Each C_pj (1≤p≤L, 1≤j≤N) will hereinafter be referred to as matching data for ID(I). A set R that is finally generated as a result of this process will be referred to as a search result.

If the receiving unit 501b has also received a storage index name from the search device 400b, the matching unit 504b reads out only the target storage index from the data storage unit 503b based on that storage index name, and performs substantially the same process.

The operation of the searchable encryption system 100 which is equivalent to a search method according to this embodiment will be described below.

Figure 22:
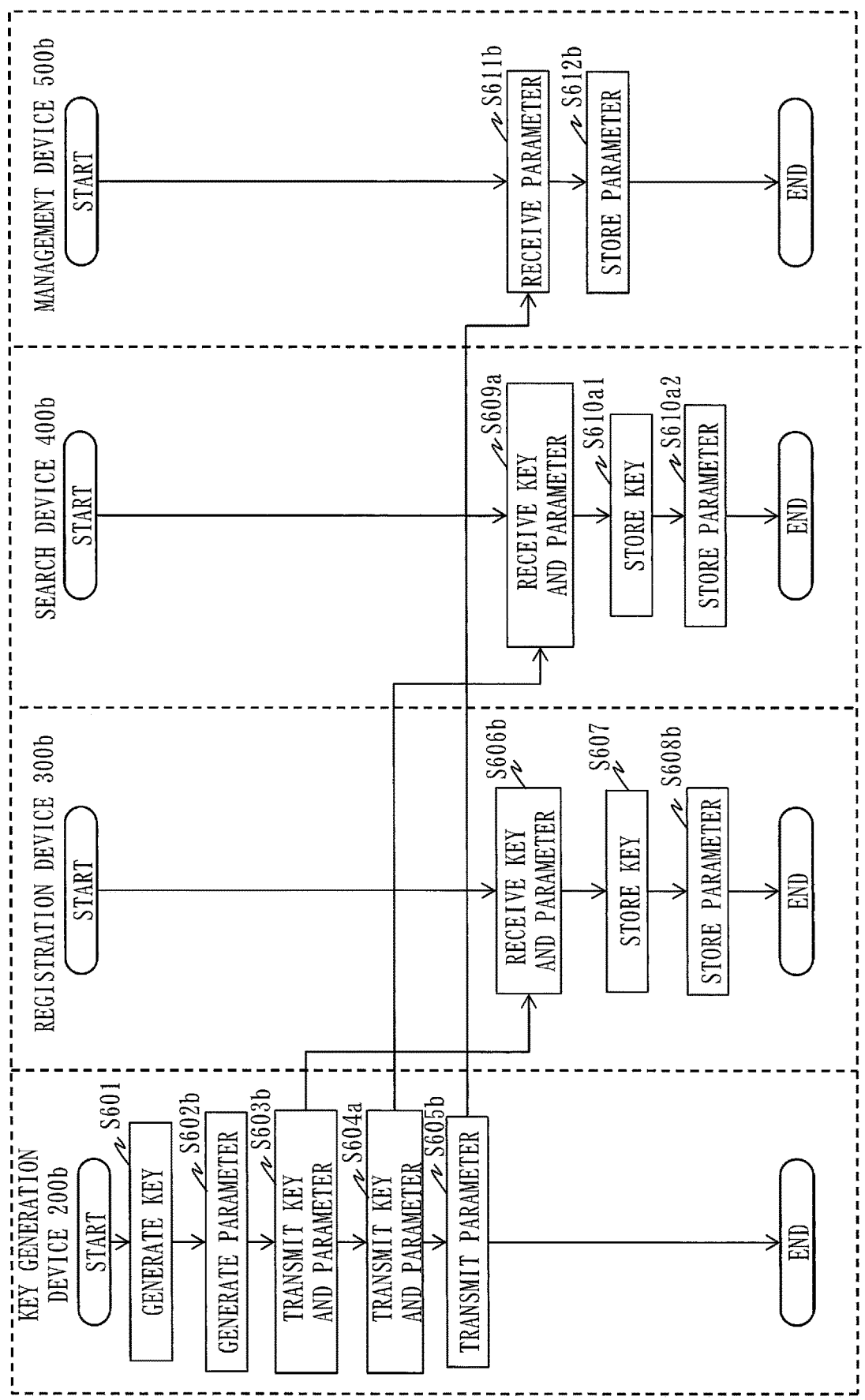
FIG. 22 is a diagram of the third embodiment and is a flowchart illustrating a key generation and storage process of a searchable search system.

FIG. 22 is a flowchart illustrating a key generation and storage process of the searchable encryption system 100 in this embodiment. S601 to S612b of FIG. 22 are steps executed by the key generation device 200b, the registration device 300b, the search device 400b, and the management device 500b. S601 to S605b are steps executed by the key generation device 200b. S606b to S608b are steps executed by the registration device 300b. S609a to S610a2 are steps executed by the search device 400b. S611b to S612b are steps executed by the management device 500a.

S601, S604a, S607, and S609a to S610a2 in this search process are steps substantially the same as those of the second embodiment, and thus will not be described.

In S602b, the parameter generation unit 202b generates parameters L, M, and N. As described above, L is the maximum number of character strings that appear when storage data is partitioned, M represents the maximum number of storage indexes that can be stored in the management device 500b by using the same key K, and N is the maximum number of pieces of storage data that can be registered at a time.

In S603b, the transmission unit 203b transmits the key K generated in S601 and the parameters (L, M, N) generated in S602b to the registration device 300b.

In S605b, the transmission unit 203b transmits the parameters (L, M, N) generated in S602b to the management device 500b.

In S606b, the receiving unit 301b receives the key K and the parameters (L, M, N) transmitted in S603b.

In S608b, the parameter storage unit 303b stores the parameters (L, M, N) received in S606b in a storage medium.

In S611b, the receiving unit 501b receives the parameters (L, M, N) transmitted in S605b.

In S612b, the parameter storage unit 502b stores the parameters (L, M, N) received in S611b in the storage medium.

S612b completes the key generation and storage process of the searchable encryption system 100.

Figure 23:
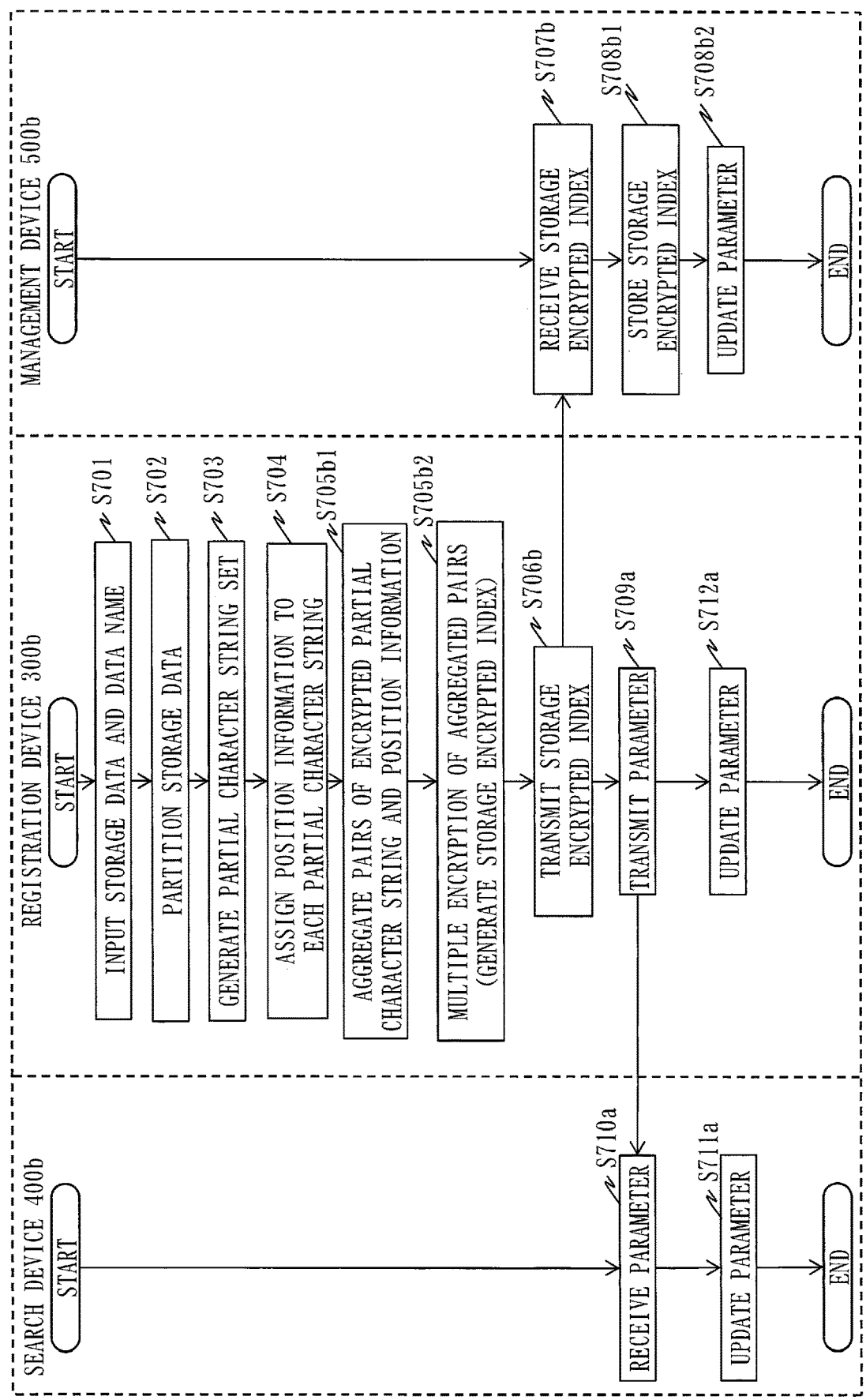
FIG. 23 is a diagram of the third embodiment and is a flowchart illustrating a data registration process of the searchable search system.

FIG. 23 is a flowchart illustrating a registration process of the searchable encryption system 100. S701 to S712a of FIG. 23 are steps executed by the registration device 300b, the search device 400b, and the management device 500b. S701 to S706b, S709a, and S712a are steps executed by the registration device 300b. S707b to S708b2 are steps executed by the management device 500b. S710a to S711a are steps executed by the search device 400b.

S701 to S704 and S709a2 to S712a in this search process are steps substantially the same as those of the second embodiment, and thus will not be described.

In S705b1, the aggregation unit 310b generates an aggregated data set Y for B1, . . . , Bn generated in S704. As described above, each element of Y is denoted as (p, w, {ID(D_il), . . . , ID(D_ik)}, {ID(D_ik+1), . . . , ID(D_in)}).

In S705b2, the multiple-encryption unit 308b receives the aggregated data set Y generated in S705b1, reads out the key K from the key storage unit 302 and the parameters (m, M, N) from the parameter storage unit 303b, and generates a storage index (ID(I), m, I).

As described above, the index I is denoted as I={(Cj, ID(D_ij))}, and Cl, . . . , Cn in each element (p, w, {ID(D_il), . . . , ID(D_ik)}, {ID(D_ik+1), . . . , ID(D_in)}) of Y are denoted as follows.

$$C1 = E(E^{\wedge}(M + 1 - m)(K, w, 0), p, 1, ID(I)),$$
$$\ldots,$$
$$Ck = E(E^{\wedge}(M + 1 - m)(K, w, 0), p, k, ID(I)),$$
$$Ck + 1 = E(E^{\wedge}(M + 1 - m)(K, w, 1), p, k + 1, ID(I)),$$
$$\ldots,$$
$$Cn = E(E^{\wedge}(M + 1 - m)(K, w, 1), p, n, ID(I))$$

In S706b, the transmission unit 309b transmits the storage index (ID(I), m, I) generated in S705b2 to the management device 500b.

In S707b, the receiving unit 501b receives the storage index (ID(I), m, I) transmitted in S706b.

In S708b1, the data storage unit 503b stores the storage index (ID(I), m, I) received in S707b.

In S708b2, the parameter storage unit 502b updates the value of the stored m, based on m of the storage index (ID(I), m, I) received in S707b.

S712a completes the registration process of the searchable encryption system 100.

Figure 24:
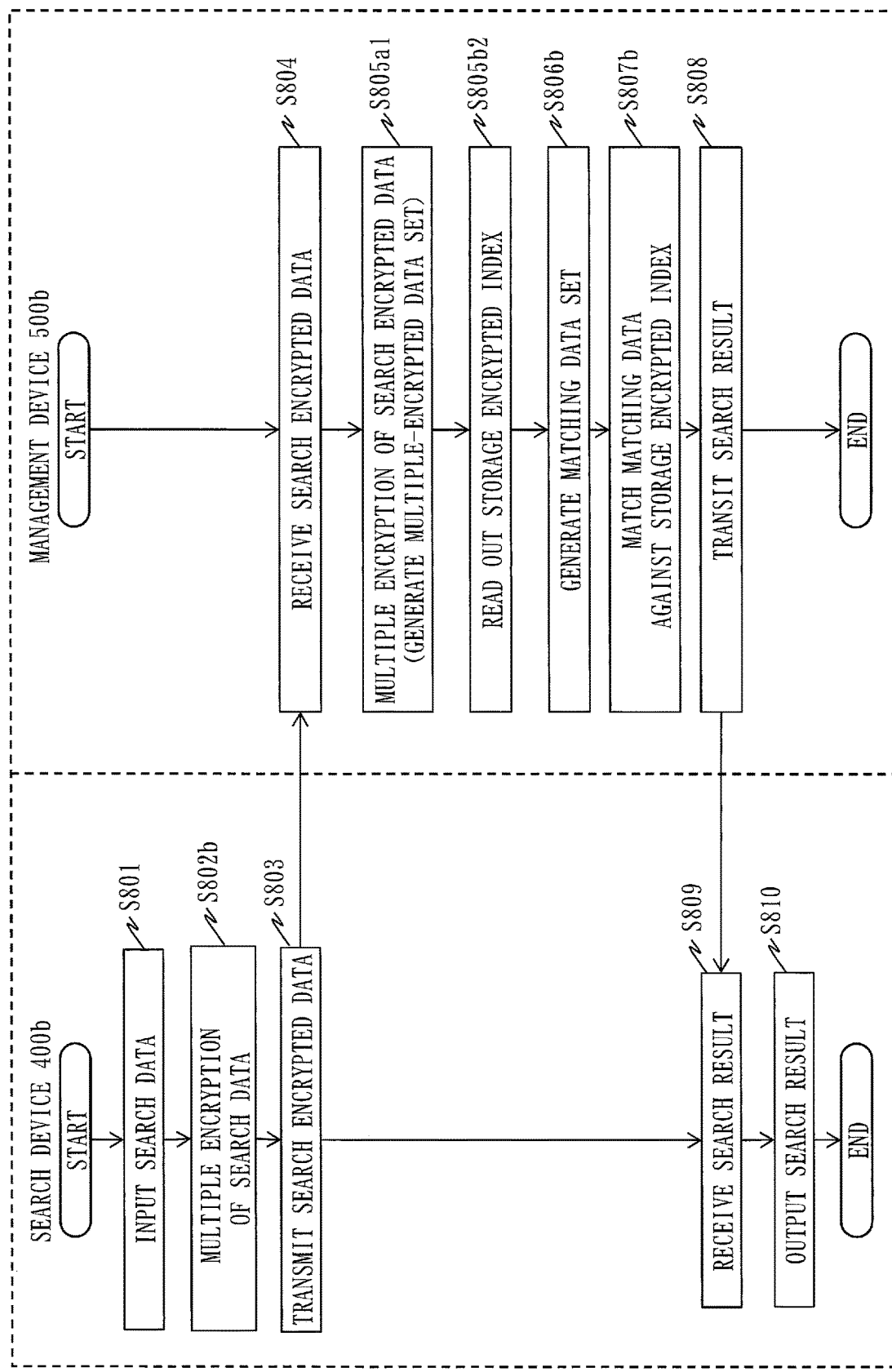
FIG. 24 is a diagram of the third embodiment and is a flowchart illustrating a data search process of the searchable search system.

FIG. 24 is a flowchart illustrating a search process of the searchable encryption system 100. S801 to S810 of FIG. 24 are steps executed by the search device 400b and the management device 500b. S801 to S803 and S809 to S810 are steps executed by the search device 400b. S804 to S808 are steps executed by the management device 500a.

S801, S803, S804 to S805a1, and S808 to S810 in this search process are steps substantially the same as those of the second embodiment, and thus will not be described.

In S802b, the multiple-encryption unit 404b reads out the key K from the key storage unit 402 and the parameter m from the parameter storage unit 407a, and generates search encrypted data t for the search data s received in S801, as indicated below, using the key K.

$$t = E^{\wedge}(M+1-m)(K, s, 0)$$

In S805b2, the matching unit 504b reads out all the storage indexes (ID(I), m, I) from the data storage unit 503b. If a storage index name has also been received in S804, only the target storage index is read out based on that storage index name. If no storage index name has been received in S804, all the stored storage indexes are read out. The storage encrypted data sets that are read out will be denoted as {(ID(I1), 1, I1)), . . . , (ID(Im), m, Im)}.

In S806b, the matching unit 504b reads out the parameters (L, N) from the parameter storage unit 502b, and with regard to each storage index (ID(Ii), i, Ii) (1≤i≤m) read out in S805b2, generates a matching data set Xi for each Ii, as indicated below, based on the multiple-encrypted data (i, ti) generated in S805a1.

For each p (1≤p≤L) and each j (1≤j≤N), C_pj=E(ti, p, j, ID(Ii)) is calculated, and a set of these L×N pieces of matching data is denoted as Xi. In this step, matching data sets Xl, Xm are generated.

In S807b, the matching unit 504b generates an empty set R concerning a search result, and performs the matching process for each matching data set Xi={C_pj} (1≤i≤m, 1≤p≤L, 1≤j≤N) generated in S806b, as described below, to generate a search result R.

It is checked whether each C_pj is included in Ii. If C_pj is included, ID(D) that is stored by being paired with that C_pj is extracted and (ID(D), p) is added to R.

As described above, if C_pj is included in Ii, but C_pj+1=E(ti, p, j+1, ID(I)) is not included in Ii, then E(ti, p, j+2, ID(I)), . . . , E(ti, p, N, ID(I)) are also not included in Ii. Thus, the matching process for these can be omitted to enhance search efficiency.

S810 completes the search process of the searchable encryption system 100. In S806b, every C_pj (1≤p≤L, 1≤j≤N) is generated in the matching data set Xi for each Ii. However, as described above, if C_pj is included in Ii, but C_pj+1=E(ti, p, j+1, ID(I)) is not included in Ii, then E(ti, p, j+2, ID(I)), . . . , E(ti, p, N, ID(I)) are also not included in Ii. Thus, the process concerning generation of some C_pj can be omitted. Specifically, this enhancement in efficiency can be realized by executing S806b and S807b repeatedly such that the matching process is performed immediately after each C_pj is generated, instead of completely separating steps of S806b and S807b.

Also in this embodiment, the storage index can be deleted by performing substantially the same deletion process as that in the first embodiment by interpreting the deletion data name as the deletion index name.

<Specific Example of Operation of This Embodiment>
The operation of this embodiment will be described with:
parameter L=3, parameter M=2, parameter N=3,
storage data D1=ABC, ID(D1)=1
storage data D2=BBC, ID(D2)=2
index name=3, and
search data s=BC.

The encryption function E will be described using the hash function.

First, the registration process of D1 and D2 will be described.

In S702, partitioning is performed as D1=(A, B, C) and D2=(B, B, C).

In S703,
A1={{(A), (AB), (ABC)}, {(B), (BC)}, {(C)} } and
A2={{(B), (BB), (BBC)}, {(B), (BC)}, {(C)}} are generated.

In S704,
B1={{(1, A), (1, AB), (1, ABC)}, {(2, B), (2, BC)}, {(3, C)} } and
B2={{(1, B), (1, BB), (1, BBC)}, {(2, B), (2, BC)}, {(3, C)}} are generated.

In S705b1, aggregation is performed as follows.
(1, A, {1}, {2}),
(1, AB, {1}, {2}),
(1, ABC, {1}, {2}),
(1, B, {2}, {1}),
(1, BB, {2}, {1}),
(1, BBC, {2}, {1}),
(2, B, {1, 2}, { }),
(2, BC, {1, 2}, { }),
(3, C, {1, 2}, { })

In S705b2, m=1 is read out, and
I=
{(C11, 1), (C12, 2),
(C21, 1), (C22, 2),
(C31, 1), (C32, 2),
(C41, 2), (C42, 1),
(C51, 2), (C52, 1),
(C61, 2), (C62, 1),
(C71, 1), (C72, 2),
(C81, 1), (C82, 2),
(C91, 1), (C92, 2)}
are generated to generate a storage index (3, 1, I).

Note that
C11=E(E^2(K, A, 0), 1, 1, 3),
C12=E(E^2(K, A, 1), 1, 2, 3),
C21=E(E^2(K, AB, 0), 1, 1, 3),
C22=E(E^2(K, AB, 1), 1, 2, 3),
C31=E(E^2(K, ABC, 0), 1, 1, 3),
C32=E(E^2(K, ABC, 1), 1, 2, 3),
C41=E(E^2(K, B, 0), 1, 1, 3),
C42=E(E^2(K, B, 1), 1, 2, 3),
C51=E(E^2(K, BB, 0), 1, 1, 3),
C52=E(E^2(K, BB, 1), 1, 2, 3),
C61=E(E^2(K, BBC, 0), 1, 1, 3),
C62=E(E^2(K, BBC, 1), 1, 2, 3),
C71=E(E^2(K, B, 0), 2, 1, 3),
C72=E(E^2(K, B, 0), 2, 2, 3),
C81=E(E^2(K, BC, 0), 2, 1, 3),
C82=E(E^2(K, BC, 0), 2, 2, 3),
C91=E(E^2(K, C, 0), 3, 1, 3),
C92=E(E^2(K, C, 0), 3, 2, 3), and
M+1−m=2.

By S707b and S708b1, the storage index (3, 1, I) is stored.
By S708b2 to S712a, the parameter m in the parameter storage unit 303a is updated to 2, and the parameter m in the parameter storage unit 407a and the parameter m in the parameter storage unit 502a are updated to 1.

Next, the search process when s=BC will be described.

In S802a, m=2 is read out, and t=E^2(K, s, 0) is calculated. Note that M+1−m=2.

In S805a1, m=1 is read out, and (1, t1) is generated with t1=t.

In S805b2, (3, 1, I) is read out.

In S806b, L=3 and N=3 are read out, and
C_11=E(t1, 1, 1, 3),
C_12=E(t1, 1, 2, 3),
C_13=E(t1, 1, 3, 3),
C_21=E(t1, 2, 1, 3),
C_22=E(t1, 2, 2, 3),
C_23=E(t1, 2, 3, 3),
C_31=E(t1, 3, 1, 3),
C_32=E(t1, 3, 2, 3), and
C_33=E(t1, 3, 3, 3)
are calculated.

In S807b, it is checked whether C_11, . . . , C_33 are included in I.
Actually, it is found out that $$C\_21 = E(t1, 2, 1, 3)$$
$$= C81, C\_22$$
$$= E(t1, 2, 2, 3)$$
$$= C82,$$

and a search result R={(1, 2), (2, 2)} is generated from (C81, 1) and (C82, 2).

In S810, based on R, search results that "the search data BC appears at the "second" position in the data of the storage data name "1" and that "the search data BC appears at the "second" position in the data of the storage data name "2"" are output.

Since C_11 is not included in I, the generation of C_12 and C_13 can be omitted by performing the matching process of S807b immediately on the generated C_1 in S806b. Similarly, since C_31 is also not included in I, the generation of C_32 and C_33 can be omitted. In this way, search efficiency can be enhanced.

The specific example has been described above.

An example of hardware resources in this embodiment is substantially the same as that in the first embodiment, and thus will not be described.

<*Effects of Third Embodiment*>

This embodiment has the following effects, for example.

In this embodiment, by storing a plurality of pieces of storage data together, instead of storing storage data piece by piece, the maximum number of pieces of storage data that can be encrypted and stored with the same key K can be increased even if the same M as in the second embodiment is selected, and search efficiency can also be enhanced.

The embodiments of the present invention have been described above. Two or more of these embodiments may be implemented in combination. Alternatively, one of these embodiments may be implemented partially. Alternatively, two or more of these embodiments may be implemented partially in combination. The present invention is not limited to these embodiments, and various modifications are possible as required.

REFERENCE SIGNS LIST

100: searchable encryption system; 101: Internet; 200, 200a, 200b: key generation device; 201: key generation unit;

202, 202a, 202b: parameter generation unit; 203, 203a, 203b: transmission unit; 300, 300a, 300b: registration device; 301, 301a, 301b: receiving unit; 302: key storage unit; 303, 303a, 303b: parameter storage unit; 304, 304b: input unit; 305: data partition unit; 306: partial character string generation unit; 307: position information assignment unit; 308: encryption unit; 308a, 308b: multiple-encryption unit; 309, 309a, 309b: transmission unit; 310b: aggregation unit; 400, 400a, 400b: search device; 401, 401a: receiving unit; 402: key storage unit; 403, 403b: input unit; 404: encryption unit; 404a, 404b: multiple-encryption unit; 405, 405b: transmission unit; 406: output unit; 407a: parameter storage unit; 500, 500a, 500b: management device; 501, 501a, 501b: receiving unit; 502, 502a, 502b: parameter storage unit; 503, 503b: data storage unit; 504, 504a, 504b: matching unit; 505: transmission unit; 506a: multiple-encryption unit; 1001: CPU; 1002: bus; 1003: ROM; 1004: RAM; 1005: communication board; 1011: display; 1012: keyboard; 1013: mouse; 1014: drive; 1020: magnetic disk device; 1021: OS; 1022: programs; 1023: files

The invention claimed is:

1. An encryption device for generation of storage encrypted data for searchable encryption that allows searching while search target data and search content remain encrypted, the encryption device comprising:
a memory; and
processing circuitry to:
receive, from a data registrant, storage data including character string data D;
partition character string data D into N pieces of element data $w_1, w_2, \ldots, W_N$ from a front to an end of the character string data D;
generate a set $A=\{A_1, A_2, \ldots, A_N\}$ and an element $A_i=\{(w_i), (w_i w_{i+1}), \ldots, (w_i w_{i+1} \ldots w_N)\}$ of the set A, where $i=1, \ldots, N$ and each element $A_i$ has $N-(i-1)$ components, from the N pieces of element data $w_1, w_2, \ldots, w_N$;
generate a set $B=\{B_1, B_2, \ldots, B_N\}$ and an element $B_i=\{(i, w_i), (i, w_i w_{i+1}), \ldots, (i, w_i w_{i+1} \ldots w_N)\}$ of the set B by associating each of $(w_i), (w_i w_{i+1}), \ldots,$ and $(w_i w_{i+1} \ldots W_N)$ which are components of the element $A_i$ with position information i;
encrypt each of $(i, w_i), (i, w_i w_{i+1}), \ldots,$ and $(i, w_i w_{i+1} \ldots W_N)$ which are components included in the element $B_i$;
generate a storage encrypted data set (ID(D), C(D)) including each of the encrypted elements of set B; and
transmit the storage encrypted data set to a management device for storage,
wherein when encrypting each component included in the element $B_i$, the processing circuitry encrypts each component included in the element $B_i$ together with an identifier to identify the character string data D.

2. The encryption device according to claim 1, wherein when encrypting each component included in the element $B_i$, the processing circuitry encrypts a component of the element $A_i$ included in the component of the element $B_i$, and encrypts the encrypted component of the element $A_i$ together with position information paired with the encrypted component of the element $A_i$.

3. The encryption device according to claim 2, wherein when encrypting the component of the element $A_i$ included in the component of the element $B_i$, the processing circuitry performs multiple encryption to repeat encryption a plurality of times.

4. The encryption device according to claim 1, wherein the processing circuitry
stores a parameter to specify a number of partitions of the character string data D, and
partitions the character string data D into N pieces, N being equal to or less than the number of partitions specified by the parameter.

5. A computer-implemented encryption method using at least one or more hardware processors for generating storage encrypted data for searchable encryption that allows searching while search target data and search content remain encrypted, the encryption comprising:
receiving, from a data registrant, storage data including character string data D;
partitioning, using the one or more hardware processors, character string data D into N pieces of element data $w_1, w_2, \ldots, w_N$ from a front to an end of the character string data D;
generating a set $A=\{A_1, A_2, \ldots A_N\}$ and an element $A_i=\{(w_i), (w_i w_{i+1}), \ldots, (w_i w_{i+1} \ldots w_N)\}$ of the set A, where $i=1, \ldots, N$ and each element $A_i$ has $N-(i-1)$ components, from the N pieces of element data $w_1, W_2, \ldots, w_N$;
generating a set $B=\{B_1, B_2, \ldots, B_N\}$ and an element $B_i=\{(i, w_i), (i, w_i, w_{i+1}), \ldots, (i, w_i, w_{i+1} \ldots w_N)\}$ of the set B by associating each of $(w_i), (w_i, w_{i+1}), \ldots,$ and $(w_i, w_{i+1} \ldots w_N)$ which are components of the element $A_i$ with position information i;
encrypting each of $(i, w_i), (i, w_i w_{i+1}), \ldots,$ and $(i, w_i w_{i+1} \ldots w_N)$ which are components included in the element $B_i$;
generating a storage encrypted data set (ID(D), C(D)) including each of the encrypted elements of set B; and
transmitting the storage encrypted data set to a management device for storage, wherein when encrypting each component included in the element $B_i$, the processing circuitry encrypts each component included in the element $B_i$ together with an identifier to identify the character string data D.

6. A non-transitory computer readable medium storing an encryption program for causing a computer to execute processes for generating storage encrypted data for searchable encryption that allows searching while search target data and search content remain encrypted, the processes comprising:
a process of receiving, from a data registrant, storage data including character string data D;
a process of partitioning the character string data D into N pieces of element data $w_1, w_2, \ldots, w_N$ from a front to an end of the character string data D;
a process of generating a set $A=\{A_1, A_2, \ldots A_N\}$ and an element $A_i=\{(w_i), (w_i w_{i+1}), \ldots w_N)\}$ of the set A, where $i=1, \ldots, N$ and each element $A_i$ has $N-(i-1)$ components, from the N pieces of element data $w_1, w_2, \ldots, w_N$;
a process of generating a set $B=\{B_1, B_2, \ldots, B_N\}$ and an element $B_i=\{(i, w_i), (i, w_i w_{i+1} \ldots w_N)\}$ of the set B by associating each of $(w_i), (w_i w_{i+1}), \ldots,$ and $(w_i w_{i+1} \ldots w_N)$ which are components of the element $A_i$ with position information i;
a process of encrypting each of $(i, w_i), (i, w_i w_{i+1}), \ldots,$ and $(i, w_i w_{i+1} \ldots w_N)$ which are components included in the element $B_i$;
a process of generating a storage encrypted data set (ID(D), C(D)) including each of the encrypted elements of set B; and a process of transmitting the storage encrypted data set to a management device for storage, wherein when encrypting each component included in the element $B_i$, the processing circuitry encrypts each component included in the element $B_i$ together with an identifier to identify the character string data D.

7. A storage device comprising:

a memory; and processing circuitry to:

receive a storage encrypted data set (ID(D), C(D));

store each piece of encrypted data of each of a plurality of components $(i, w_i)$, $(i, w_i w_{i+1})$, ..., and $(i, w_i w_{i+1} \ldots w_N)$ which are generated through a process of receiving, from a data registrant, storage data including character string data D;

a process of partitioning the character string data D into N pieces of element data $W_1, W_2, \ldots, W_N$ from a front to an end of the character string data D, a process of generating a set $A=A_1, A_2, \ldots, A_N\}$ and an element $A_i=\{(w_i), (w_i w_{i+1}), \ldots, (w_i w_{i+1} \ldots w_N)\}$ of the set A, where i=1, ... N and each element $A_i$ has N−(i−1) components, from the N pieces of element data $w_1, w_2, \ldots, w_N$, a process of generating a set $B=\{B_1, B_2, \ldots, B_N\}$ and an element $B_i=\{(i, w_i), (i, w_i w_{i+1}), \ldots, (i, w_i w_{i+1} \ldots w_N)\}$ of the set B by associating each of $(w_i)(w_i w_{i+1}), \ldots,$ and $(w_i w_{i+1}) \ldots w_N)$ which are components of the element $A_i$ with position information i, a process of encrypting each of $(i, w_i)$, $(i, w_i w_{i+1})$, ..., and $(i, w_i w_{i+1} \ldots w_N)$ which are the components included in the element $B_i$; and a process of generating the storage encrypted data set (ID(D), C(D)) including each of the encrypted elements of set B;

receive search encrypted data obtained by encrypting a character string to be searched for;

store an integer L having a value greater than or equal to an integer N of the N pieces of element data; and based on the search encrypted data and L integers from 1 to the integer L, generate a plurality of pieces of matching data to be used for matching against each piece of the encrypted data, and extract a piece of the encrypted data which matches each piece of the matching data, wherein when encrypting each component included in the element $B_i$, the processing circuitry encrypts each component included in the element $B_i$ together with an identifier to identify the character string data D.

8. The storage device according to claim 7, wherein for each integer of the L integers from 1 to the integer L, the processing circuitry generates the matching data including the search encrypted data and said integer.

9. The storage device according to claim 7, wherein the processing circuitry receives the search encrypted data obtained by encrypting multiple times the character string to be searched for, and for each integer of the L integers from 1 to the integer L, generates the matching data including data obtained by encrypting multiple times the search encrypted data and including said integer.

* * * * *